United States Patent
Huang et al.

(10) Patent No.: US 11,438,786 B1
(45) Date of Patent: Sep. 6, 2022

(54) BANDWIDTH ESTIMATION AND MANAGEMENT FOR CONNECTED DEVICES

(71) Applicant: AMAZON TECHNOLOGIES, INC., Seattle, WA (US)

(72) Inventors: Rongsheng Huang, San Jose, CA (US); Ravi Ichapurapu, Morgan Hill, CA (US); Morris Yuanhsiang Hsu, Sunnyvale, CA (US); Vipul Jain, Union City, CA (US); Jungtao Liu, Saratoga, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 63 days.

(21) Appl. No.: 16/009,950

(22) Filed: Jun. 15, 2018

(51) Int. Cl.
| | | |
|---|---|---|
| H04W 28/02 | (2009.01) | |
| H04L 43/10 | (2022.01) | |
| H04W 40/12 | (2009.01) | |
| G06F 3/16 | (2006.01) | |
| H04L 45/12 | (2022.01) | |
| H04W 84/12 | (2009.01) | |

(52) U.S. Cl.
CPC .......... H04W 28/0215 (2013.01); G06F 3/16 (2013.01); H04L 43/10 (2013.01); H04L 45/123 (2013.01); H04W 40/12 (2013.01); H04W 84/12 (2013.01)

(58) Field of Classification Search
CPC ......... H04W 28/0215; H04W 28/0221; H04W 40/12; H04W 40/125; H04W 4/70; H04W 4/80; H04W 84/12; H04L 43/10; H04L 43/0876; H04L 43/0882; H04L 43/0888; H04L 43/0894; H04L 1/0002; H04L 1/0033; H04L 1/0036; H04L 1/0041; H04L 5/0064; H04L 45/123; H04L 45/125; H04L 45/127; G06F 3/16
See application file for complete search history.

(56) References Cited

U.S. PATENT DOCUMENTS

| | | | | |
|---|---|---|---|---|
| 9,497,315 | B1 * | 11/2016 | Pakidko | H04M 3/2281 |
| 2002/0080739 | A1 * | 6/2002 | Kuwahara | H04B 1/715 |
| | | | | 370/333 |
| 2007/0133454 | A1 * | 6/2007 | Ware | H04W 72/1231 |
| | | | | 370/328 |
| 2010/0091669 | A1 * | 4/2010 | Liu | H04L 45/20 |
| | | | | 370/252 |
| 2015/0189006 | A1 * | 7/2015 | Smus | H04B 11/00 |
| | | | | 709/204 |

(Continued)

*Primary Examiner* — Peter Chen
(74) *Attorney, Agent, or Firm* — Lindauer Law, PLLC

(57) ABSTRACT

A group of devices connected on a wireless local area network (WLAN) operate in conjunction with one another to present content. Devices in the group may be wirelessly connected via personal area network (PAN) to other devices, such as speakers. An election process is used to select a primary device. The primary device may receive content from an external source, such as a server, and distribute that content to other devices within the group via the WLAN. The parameters of that distribution, such as a content rate indicative of a bitrate of the content, transfer limit rate, and so forth are configured to preserve fidelity of the presentation while minimizing interruptions to presentation that may result due to frequency contention between the WLAN and the PAN, traffic on the WLAN, and so forth.

20 Claims, 14 Drawing Sheets

(56) References Cited

U.S. PATENT DOCUMENTS

| | | | | |
|---|---|---|---|---|
| 2016/0081135 A1* | 3/2016 | Kang | ................ | H04R 3/00 |
| | | | | 455/41.2 |
| 2017/0243485 A1* | 8/2017 | Rubin | ................ | H04W 72/005 |
| 2018/0027327 A1* | 1/2018 | Wang | ................ | H04R 1/028 |
| | | | | 381/300 |

* cited by examiner

BANDWIDTH ESTIMATION AND MANAGEMENT FOR CONNECTED DEVICES

BACKGROUND

Devices may communicate with one another wirelessly. This wireless communication is subject to variations in link quality, contention with operation of other wireless services, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
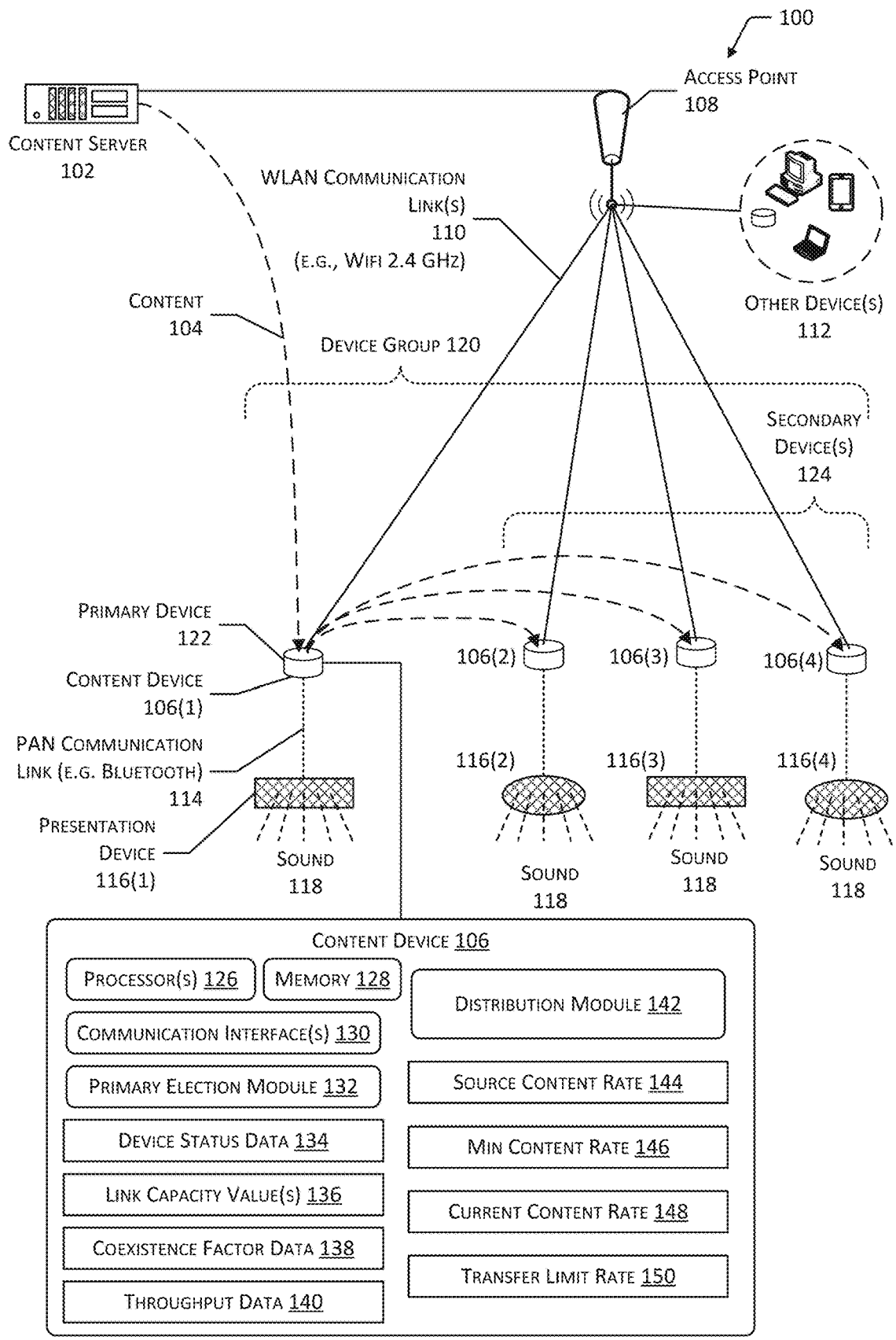
FIG. 1 illustrates a system in which bandwidth between devices on a wireless network is assessed and used to control how content is distributed between devices, according to one implementation.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Devices may communicate wirelessly with one another using one or more protocols. For example, a content device may retrieve content from an external source and send that content to a presentation device for output to a user.

The content device may connect with other content devices, presentation devices, and so forth using one or more protocols. For example, a content device may connect to a wireless local area network (WLAN) access point using a WiFi protocol. The access point may in turn connect to another network, such as a local area network (LAN), wide area network (WAN) such as the Internet, and so forth. The content device may use the WLAN to retrieve data, such as content, from a server on the Internet. The content may comprise audio, video, an executable application, text, and so forth.

The content device includes built-in output devices to present content, or may use an external presentation device. The presentation device, such as a speaker, display device, and so forth, may be connected wirelessly to the content device using a personal area network (PAN) or other system. For example, the content device may receive content using the WiFi WLAN, and use a Bluetooth PAN to send the content to a presentation device such as a wireless speaker to produce sound that is audible to a user.

In some situation, communications using the WLAN and the PAN may interact with one another, impacting the coexistence of these protocols. This impact may include a reduction in overall throughput due to interference, context changes, and so forth. For example, the WiFi network (WLAN) and Bluetooth network (PAN) may use the same or adjacent radio frequencies, resulting in possible radio frequency interference between the two. In another example, hardware or software constraints may limit the first device to one protocol at a time, such as when a single transceiver is used to operate on WiFi or Bluetooth at any given time.

A home, business, or other facility may have several content devices located throughout. These content devices may connect wirelessly to a common network, such as the WLAN by way of an access point. Some of these content devices may, in turn, wirelessly communicate with presentation devices. In some implementations, content may be presented using the content devices, the presentation devices connected to content devices, and so forth. For example, a user may wish to have music presented using various Bluetooth speakers located in different rooms of the home.

Traditional techniques of content distribution may fail to address user expectations, particularly in an environment with coexistent wireless protocols, such as WiFi and Bluetooth. Described in this disclosure are techniques to estimate bandwidth and manage the content devices such that content is presented with the best possible quality in this coexistent environment, while avoiding situations such as buffer exhaustion, or perceptible defects in presentation such as stutters, gaps, pops, and so forth that result from inadequate data transfer.

A device group of content devices on the WLAN may be determined. For example, the device group may be limited to those content devices that are available for use to present content, meet minimum performance requirements, and so forth. A primary device is elected from the device group. The primary device distributes content to one or more secondary devices in the device group using the WLAN. The secondary devices may then send, using the PAN, the content to presentation devices.

The primary device may be elected from one of the content devices in the device group based on link capacity values, throughput data, coexistence factor data, and so forth. For example, the link capacity values are indicative of how much data per second is expected to be transferred by the content device being assessed. The link capacity values may be based on a receive rate of physical hardware, a coexistence factor data, efficiency of a transmission control protocol, available airtime, and a packet success rate.

Once elected, the primary device distributes content to the other (secondary) content devices in the device group. The primary device may store the content, receive the content from a content server, and so forth. For example, the primary device may use the WLAN to receive via the Internet the content from a content server. The content may be transferred from the content server to the primary device at a source content rate. For example, if the content comprises audio, the source content rate may be 320 kilobits per second (kbps).

Due to various factors, such as contention between the WLAN and PAN, link capacity limitations with the secondary devices, and so forth, the primary device may determine a transfer limit rate. The transfer limit rate specifies a maximum amount of bandwidth, such as a limit rate, on the WLAN that is allocated for use by the primary device to send content to secondary devices. For example, the transfer limit rate may be expressed as kbps. In some implementations the primary device may be configured to use a source content rate that is one half the transfer limit rate, selecting a source content rate that meets this limitation. Continuing the above example, if the source content rate is 320 kbps, the transfer limit rate may be set to 640 kbps.

Under some conditions, the throughput of the primary device on the WLAN may be decreased. For example, the presence of many secondary devices, heavy use of the PAN, and so forth may limit throughput. The primary device may be configured to transfer content to the secondary devices with a current content rate that is between a minimum (min) content rate and the source content rate. The min content rate specifies a minimum bitrate of the content as transferred. The min content rate may be based at least in part on actual or perceived quality of the content as presented. For example, if the content is audio, the min content rate (or audio rate, in this example) may be 128 kbps, below which the audio is deemed to be unusable. In some implementations, the source content rate, min content rate, and current content rate may be indicative of a content encoding bitrate.

Several techniques are described to determine the primary device. In one implementation, candidate primary devices each provide a link capacity value to an election primary. The election primary then uses the link capacity values to select as the primary device the candidate with the greatest link capacity. Once selected, throughput data is determined that indicates the throughput of the primary device. Based on this throughput, the transfer limit rate is specified.

The current content rate is determined based on the transfer limit rate. The current content rate may be some fraction of the transfer limit rate. This provides for the availability of additional bandwidth, that in turn prevents dropouts or other problems that could affect the quality of the content as presented. In some implementations, the current content rate may be constrained to a value that is between the min content rate and a value that is one-half the throughput of the primary device. If the content is available as specific bitrates, the greatest bitrate that is less than one-half the throughput may be selected. For example, if the transfer limit rate is 570 kbps and the content rate is less than or equal to one-half this, the maximum content rate would be 285 kbps. Continuing the example, the content may be available from the content server with different source content rates of 192 kbps, 256 kbps, and 320 kbps. The 320 kbps content rate is greater than the maximum content rate of 285 kbps, while the 256 kbps content rate is closest to but does not exceed the maximum content rate. For example, the content rate is closest that has a value that is less than or equal to the maximum content rate and has a least difference with the maximum content rate compared to any other content rate. Continuing the example, given the maximum content rate of 285 kbps and content rates of 256 kbps and 128 kbps, the difference of 285 kbps −256 kbps=29 kbps which is less than 285 kbps−128 kbps=157 kbps.

As a result, the primary device may obtain content from the content server with a current content rate of 256 kbps, and send that content to the secondary devices.

As the environment changes, the system as described adapts to those changes. For example, if a new content device is placed on the network, a new election for primary device may be performed. In another example, if a content device is paired with a Bluetooth speaker, a new current content rate may be determined. In yet another example, a new determination of the current content rate may be made in between presentation of different pieces of content.

By using the techniques described in this disclosure, the system is able to facilitate operation in environments where different wireless protocols coexist, maintaining usability while assuring at least a minimum level of quality in the content that is presented. The system improves the ability of multiple devices on a network to receive content while operating within bandwidth constraints.

FIG. 1 illustrates a system 100 in which bandwidth between devices on a wireless network is assessed and used to control how content is distributed between devices, according to one implementation.

A content server 102 provides content 104 to a content device 106. The content server 102 may be accessed via a WAN, such as the Internet. The content 104 may comprise audio, video, an executable application, text, and so forth. For example, the content 104 may comprised digitized audio.

The content devices 106 may connect to one or more access points 108 via one or more WLAN communication links 110 to form a wireless local area network (WLAN). For example, content devices 106(1)-(4) are connected to the access point 108 in this illustration. In other examples, other quantities of content devices 106 may be present.

The devices that may use the WLAN are able to communicate with one another, or with other resources such as the content server 102. The WLAN communication links 110 between the content devices 106 and the access point 108 may be compliant with a first protocol, such as WiFi. Other devices 112 may also connect to the one or more access points 108. For example, a laptop computer may connect to the access point 108.

In some implementations the system 100 may include a wired local area network (LAN), such as an Ethernet network. For example, some of the content devices 106 may be connected via a wired Ethernet connection to the LAN, and the LAN may in turn be connected to the access point 108. The system 100 may thus support homogeneous networks or heterogeneous networks. In some implementations, the system 100 may comprise devices that are connected to a common subnetwork or subnet.

The content devices 106 may allow a user to interact with content 104. For example, the content devices 106 may include network enabled speakers, appliances, home entertainment systems, televisions, and so forth. In some implementations the content devices 106 may include output devices such as displays, speakers, and so forth that may be used to present content. For example, the content device 106 may include a speaker that can be used to produce sound from the audio content 104.

One or more of the content devices 106 may be able to establish a personal area network (PAN) communication link 114 with other devices 112, such as a presentation device 116. The presentation device 116 may include one or more output devices such as speakers, displays, haptic devices, printers, actuators, and so forth. For example, the content device 106 may use the PAN communication link 114 to send the content 104 comprising audio to an external speaker that produces sound 118. By way of illustration and not necessarily as a limitation, the content devices 106(1)-(4) are shown connected to presentation devices 116(1)-(4), respectively. In other implementations, some content devices 106 may not be connected to presentation devices 116, or may be connected to more than one presentation device 116. For example, a content device 106 may be connected to three presentation devices 116. The presentation devices 116 may have the same or different capabilities. For example, some presentation devices 116 may comprise speakers to provide sound 118, while other presentation devices 116 may comprise displays to present images.

A device group 120 is shown including content devices 106(1)-(4). In some implementations, the content devices 106 in the device group 120 may be operated in unison with one another. For example, the content devices 106(1)-(4) and their associated presentation devices 116(1)-(4) may be arranged throughout a home of the user, and may be used to play the same content 104, such as music, throughout the home at the same time.

Within the device group 120, a primary device 122 is selected. The remaining content devices 106 within the device group 120 may be deemed secondary devices 124. The primary device 122 is configured to distribute content 104 to the secondary devices 124. The primary device 122 and the secondary devices 124 may then be used to present content 104, either using internal output devices or via the presentation devices 116.

The primary device 122 may receive the content 104 from the content server 102. The content server 102 may be accessible via a WAN, such as the Internet. Use of the primary device 122 reduces bandwidth consumption between the WLAN and the content server 102, improving the overall efficiency of the network.

During operation, the system 100 makes several determinations. For example, a primary device 122 is elected, the members of the device group 120 are identified, the current content rate of the content 104 is selected, and the primary device 122 controls the distribution of the content 104 to the secondary devices 124.

The content device 106 may include one or more hardware processor(s) 126 (processors) configured to execute one or more stored instructions. The processors 126 may include microcontrollers, systems on a chip (SoC), field programmable gate arrays, digital signals processors, graphic processing units, general processing units, and so forth. One or more clocks may provide information indicative of date, time, ticks, and so forth.

The content device 106 may include memory 128 comprising one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 128 provides storage of computer-readable instructions, data structures, program modules, at least a portion of content 104, and other data for the operation of the content device 106. A few modules are shown stored in the memory 128, although the same functionality may alternatively be implemented in hardware, firmware, or as a SoC. The modules may comprise instructions, that may be executed at least in part by the one or more processors 126.

For clarity, other elements of the content device 106 are not shown, such as power supplies, clocks, input devices, sensors, output devices, and so forth. For example, the content device 106 may include one or more microphones, speakers, accelerometers, displays, and so forth.

The content device 106 includes one or more communication interfaces 130 to communicate with other content devices 106, presentation devices 116, or other devices 112. The communication interfaces 130 may include devices configured to couple to one or more networks, including WLANs, WANs, wireless WANs, and so forth. For example, the communication interfaces 130 may include devices compatible with Ethernet, WiFi, WiFi Direct, 3G, 4G, LTE, and so forth. The communication interfaces 130 may include devices configured to couple to one or more PANs, such as Bluetooth, Bluetooth Low Energy, ZigBee, Z-Wave, and so forth.

The degree to which the WLAN and PAN communication links may coexist may be determined at least in part by the communication interfaces 130 of the particular content device 106. Coexistent operation may be limited in implementations where the communication interfaces 130 share one or more components. For example, a common transceiver and antenna may be used to establish the WLAN communication link 110 using WiFi at 2.4 GHz and also the PAN communication link 114 using Bluetooth at 2.4 GHz. In this example, the communication interface 130 may only permit the content device 106 to communicate using either WiFi or Bluetooth at any particular time. With this configuration, the WLAN and PAN communication links have a limited ability to coexist. For example, while the communication interface 130 is receiving content 104 using the WLAN communication link 110, it cannot be used to send content 104 to the presentation device 116.

Different content devices 106 may have different communication interfaces 130, or configurations thereof. For example, the content device 106(4) may allow for simultaneous operation of both WiFi and Bluetooth by utilizing separate transceivers, each on a separate antenna. In this example, the WLAN and PAN communication links may be able to readily coexist, such as allowing simultaneous operation with both protocols.

Different types of content devices 106 may have different capabilities. For example, some content devices 106 may have faster processors 126 than others, more memory 128, different configurations of communication interfaces 130, different software installed, and so forth. As a result, the device group 120 may include a heterogeneous set of devices.

In addition to these different capabilities, the content devices 106 may be physically placed at different locations with respect to the access point 108 and one another. For example, content device 106(1) may be in the same room as content device 106(2), while content device 106(4) is at a far end of the house.

The WLAN communication links 110 are affected by many factors including, but not limited to, the capabilities of the content devices 106 and access point 108, location, presence of users, the radio frequency (RF) environment, and so forth. Content devices 106 may be added to or removed from the WLAN as new devices enter or leave the environment. Content devices 106 may be added to or removed from the device group 120 for various reasons. Presentation devices 116 may be added or removed. The environment in which the content devices 106 operate may exhibit variability. A content device 106 may be determined to be a primary device 122 at one time, but as conditions change, another content device 106 may be better suited for the role of primary device 122.

The content device 106 may include a primary election module 132 that is used to determine which of the content devices 106 will operate as the primary device 122. The primary election module 132 may use information such as device status data 134, link capacity value(s) 136, coexistence factor data 138, throughput data 140, and so forth from one or more of the content devices 106 on the WLAN to determine the primary device 122. For example, the content device 106 that is determined during testing to provide the greatest overall throughput to the other content devices 106 may be elected as the primary device 122. The process of performing the primary device 122 election is discussed in more detail below, for example at FIGS. 3A-3B.

The device status data 134 may include information such as type of processor 126, type of communication interface(s) 130, processor utilization data, memory utilization data, available airtime on a given network, presence of a connected presentation device 116, and so forth. The link capacity values 136 provide information about link capacity, indicative of the amount of data per unit time that a particular communication link is able to provide. The link capacity may be determined based at least in part on the device status data 134 and the coexistence factor data 138.

The coexistence factor data 138 comprises information indicative of the ability of a particular device to accommodate communication with a first network, such as the WLAN, and a second network, such as the PAN. The coexistence factor data 138 may include a coexistence factor that is a dimensionless number that is associated with a particular content device 106, type of content device 106, and so forth. For example, a low coexistence factor such as "1" may indicate that a particular type of content device 106 is only able to communicate at a given time using WiFi or Bluetooth. In another example, a high coexistence factor such as "3" may indicate that a particular type of content device 106 is able to simultaneously communicate using both WiFi and Bluetooth. The coexistence factor is indicative of the impact on data transfer by a first communication link, such as WiFi, as impacted by a second communication link, such as Bluetooth on the same content device 106.

The coexistence factor data 138 may be determined by testing, prior input, or be based on other information such as the device status data 134. For example, the device status data 134 may include information indicative of the particular make and model of the content device 106 and the communication interface(s) 130 therein.

In one implementation, the following equation may be used to calculate the link capacity Lx:

$$Lx = Rx * C * E * A * P$$

where Lx indicates the link capacity with respect to device x, Rx is the physical receive (RX PHY) rate of the communication interface 130, C is the coexistence factor for that content device 106, E is the estimated efficiency of the transmission protocol, such as a transmission control protocol (TCP) or equivalent, used during data transmission, A is the available airtime indicative of time the communication link is available for use, and P is the packet success rate indicative of a ratio of successful transmission of a packet. For example, the available airtime may be determined as time available for use in sending data divided by total time. Equation 1

For example, the value of C may be determined by retrieving coexistence factor data 138 stored in the memory 128, such as in a lookup table. The value of E may be previously specified or determined based on testing. For example, E may be determined to be 0.7. The value of A may vary based on overall congestion of an RF environment. For example, on a 2.4 GHz band that is congested, A=0.4 while on a 5 GHz band that is less congested, A=0.85. Likewise, P may be previously specified or determined based on testing. For example, P for the 2.4 GHz band may be 0.2 while P for the 5 GHz band may be 0.55.

In some implementations, the primary election module 132 may use the throughput data 140 to determine the primary device 122. The throughput data 140 comprises information indicative of the throughput of a particular content device 106, such as the primary device 122 or a content device 106 that is under test, with respect to the devices 124. For example, throughput data 140 may comprise a throughput "T" that is indicative of the expected rate at which data can be transferred from the primary device 122 to one or more of the secondary devices 124.

The throughput T may be calculated as a harmonic mean of the link capacities in the device group 120. In one implementation, the following equation may be used to calculate the throughput T:

$$T = \frac{1}{\frac{N}{L_M} + \sum_{i=1}^{N-1} \frac{1}{L_{S,i}}}$$

where N is the number of content devices 106 in the device group 120, $L_M$ is the link capacity of the primary device 122, and $L_{S,i}$ is the link capacity of the $i^{th}$ secondary device 124. Equation 2

In some implementations, the throughput T may be calculated by dividing the harmonic mean by the number of hops for communication on the links being tested. For example, a hop may comprise a device that routes or forwards a packet on a link between the content devices 106, content server 102, and so forth.

The primary election module 132 may perform other functions as well. For example, the primary election module 132 may determine which content devices 106 are members of the device group 120. Continuing the example, the primary election module 132 may remove underperforming content devices 106 from the device group 120, such as those with link capacity that is less than a threshold value.

The content device 106 may include a distribution module 142 that coordinates the distribution of content 104 to the secondary devices 124. For example, the distribution module 142 may receive the content 104 from the content server 102 and send that content 104 to the secondary devices 124 using the WLAN communication links 110.

The content 104 may be provided by the content server 102 at a source content rate 144. The source content rate 144 may be indicative of the bitrate at which the content 104 is encoded. For example, if the content 104 is audio, the source content rate 144 may be 320 kbps. In some implementations, the content server 102 may be able to provide the content 104 at different source content rates 144. For example, the content server 102 may be able to provide the content 104 with source content rates 144 of 192 kbps, 256 kbps, and 320 kbps.

The distribution module 142 attempts to maintain that the content 104 provided to the content devices 106 in the device group 120 does not fall below a minimum (min) content rate 146. The min content rate 146 specifies a minimum bitrate of the content 104 to be distributed. The min content rate 146 may be based at least in part on actual or perceived quality of the content 104 as presented. The min content rate 146 may be associated with a particular encoding bitrate, type of codec or encoding scheme, and so forth. For example, if the content 104 is audio, the min content rate 146 (or "audio rate" in this example) may be 128 kbps, below which the audio is deemed to be unusable.

The distribution module 142 determines a current content rate 148 of the content 104 as distributed to the content devices 106 in the device group 120 using the WLAN communication links 110. The current content rate 148 may be constrained to a value that is greater than or equal to the min content rate 146 and less than a transfer limit rate 150.

The transfer limit rate 150 specifies a maximum amount of bandwidth on the WLAN that is allocated for use by the primary device 122 to send content 104 to secondary devices 124. The transfer limit rate 150 may be determined based on the throughput data 140. The current content rate 148 may then be determined based on the transfer limit rate 150. In one implementation, the current content rate 148 may be some fraction less than one of the transfer limit rate 150. For example, the current content rate 148 may be less than or equal to one-half the transfer limit rate 150. The ratio of the transfer limit rate 150 to the throughput may be determined to allow the content device(s) 106 to be able to use the PAN communication links 114 to send the content 104 to the presentation devices 116.

By constraining the distribution of content 104 as described above, the system 100 minimizes or eliminates situations such as presentation stutters due to buffer exhaustion when a secondary device 124 is not receiving content 104 quickly enough to maintain presentation of the content 104. Additionally, by using the transfer limit rate 150, the system 100 may also avoid saturating the WLAN, which may adversely impact other services.

In some implementations, the distribution module 142 may request content 104 at a particular source content rate 144. For example, once the current content rate 148 has been determined, the distribution module 142 may request the closest source content rate 144 that is less than the transfer limit rate 150. Continuing the example, if the current content rate 148 is 192 kbps and the transfer limit rate 150 is 285 kbps, the distribution module 142 may request the content 104 from the content server 102 with a source content rate 144 of 192 kbps.

In another implementation, the content device 106 may convert the content 104 from the source content rate 144 to the current content rate 148. For example, if the content 104 is only available at a 320 kbps source content rate 144, the content device 106 may downsample the content 104 to 192 kbps for distribution.

In yet another implementation, the content device 106 may compress the content 104 prior to distribution, reducing the amount of data transferred to that consistent with the current content rate 148. For example, if the content 104 is only available at a 320 kbps source content rate 144, the content device 106 may use a compression algorithm to reduce the size of data transferred such that distribution can be maintained at 192 kbps.

One of more of these implementations may be combined. For example, the content server 102 may provide content 104 at a requested source content rate 144 and the content device 106 may downsample and then compress the resulting data to maintain a current content rate 148 that is between the min content rate 146 and the transfer limit rate 150.

While various functions are described with respect to the primary election module 132 and the distribution module 142, in other implementations other configurations and other modules are possible. For example, a single module may perform the functions of both the primary election module 132 and the distribution module 142. In another example, the content device 106 may include a downsampling module, compression module, and so forth.

Figure 2:
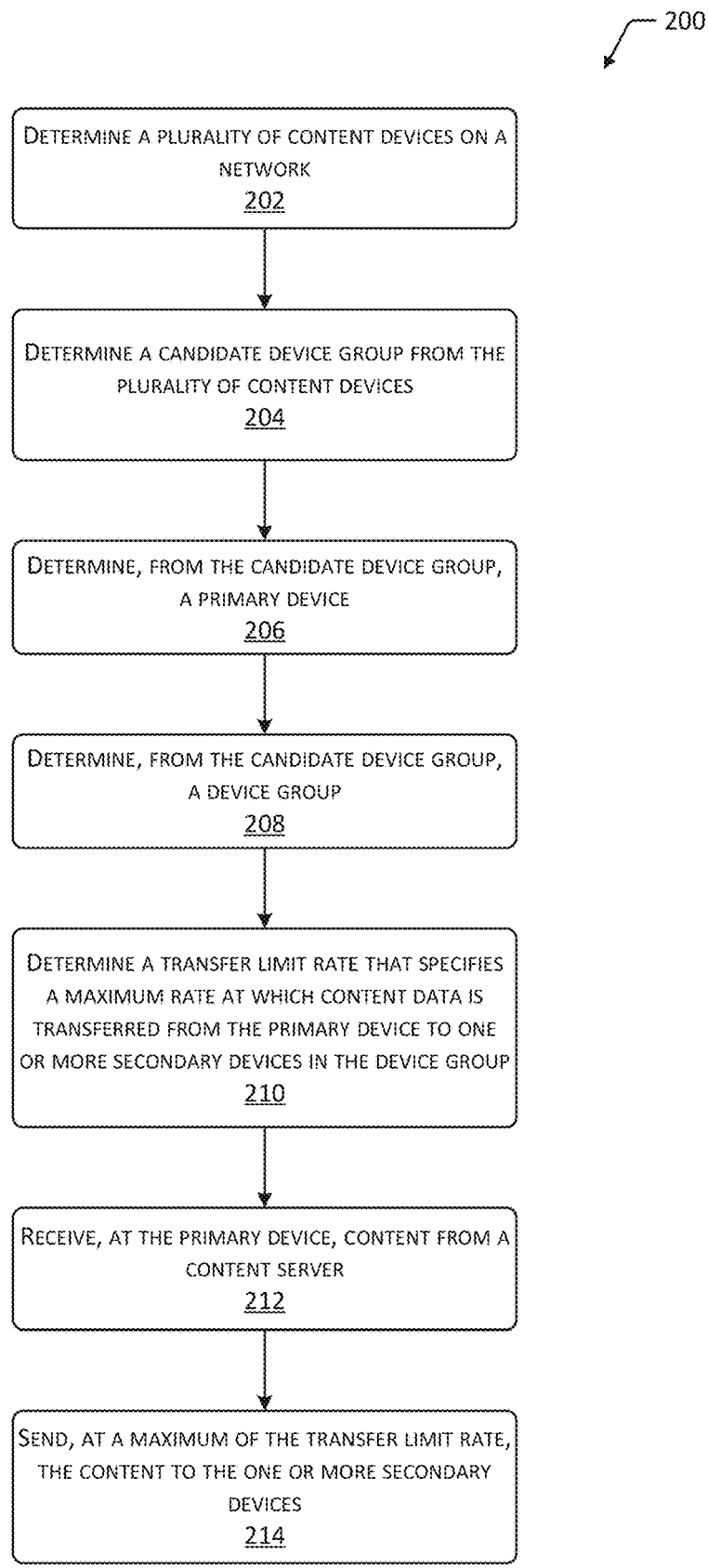
FIG. 2 is a flow diagram illustrating a method for determining a device group with a primary device and controlling the transfer of content from the primary device to secondary devices, according to one implementation.

FIG. 2 is a flow diagram 200 illustrating a method for determining a device group 120 with a primary device 122 and controlling the transfer of content from the primary device 122 to secondary devices 124, according to one implementation. The method may be implemented at least in part by a content device 106.

At 202 a plurality of content devices 106 are determined to be on a network. The network may comprise a WLAN, LAN, and so forth. For example, the plurality of content devices 106 may be determined to be in communication with one another via WLAN communication links 110 to the access point 108. In some implementations one or more of the content devices 106 may be connected using the wired LAN. The content devices 106 may broadcast or otherwise announce their presence on the network, or may respond to an instruction that initiates a transmission announcing the content device 106 is on the network. For example, upon connecting to the access point 108, the content device 106 may broadcast a packet on the WLAN.

At 204 a candidate device group is determined from the plurality of devices. One of the content devices 106 may be selected as an election primary, such as described below. For example, a content device 106 may be randomly selected to act as the election primary. The election primary may then determine which content devices 106 are to be included in the candidate device group. For example, content devices 106 may be omitted from the candidate device group that lack specified capabilities such as processor 126, memory 128, installed modules, and so forth.

At 206 a primary device 122 is determined from the candidate device group. For example, the primary device 122 may be selected as the content device 106 that exhibits the greatest link capacity, greatest throughput, and so forth. Implementations of the determination of the primary device 122 are described at least with regard to FIGS. 3A-3B and FIG. 4. In some implementations, the following operations may be performed by the primary device 122.

At 208 a device group 120 is determined from the candidate device group. In one implementation, content devices 106 that exhibit one or more of link capacity, throughput, and so forth that are below a threshold value may be omitted from the device group 120. For example, the content device 106 that exhibits a lowest link capacity may be omitted from the device group 120.

At 210 a transfer limit rate 150 is determined. For example, the transfer limit rate 150 may be based at least in part on the throughput data 140. The determination of the transfer limit rate 150 is discussed in more detail at least with regard to FIGS. 3B, 6, 7, 10.

At 212 the primary device 122 receives content 104 from the content server 102. For example, the primary device 122 may send data to the content server 102 that is indicative of the current content rate 148. The content server 102 may then send the content 104 at a source content rate 144 that is less than or equal to the current content rate 148.

At 214 the primary device 122 sends, at a maximum of the transfer limit rate 150, the content 104 to the one or more secondary devices 124. If so equipped, the primary device 122 may present the content 104 using an output device, may send, using the PAN communication link 114, the content 104 to an attached presentation device 116, and so forth.

Figure 3A:
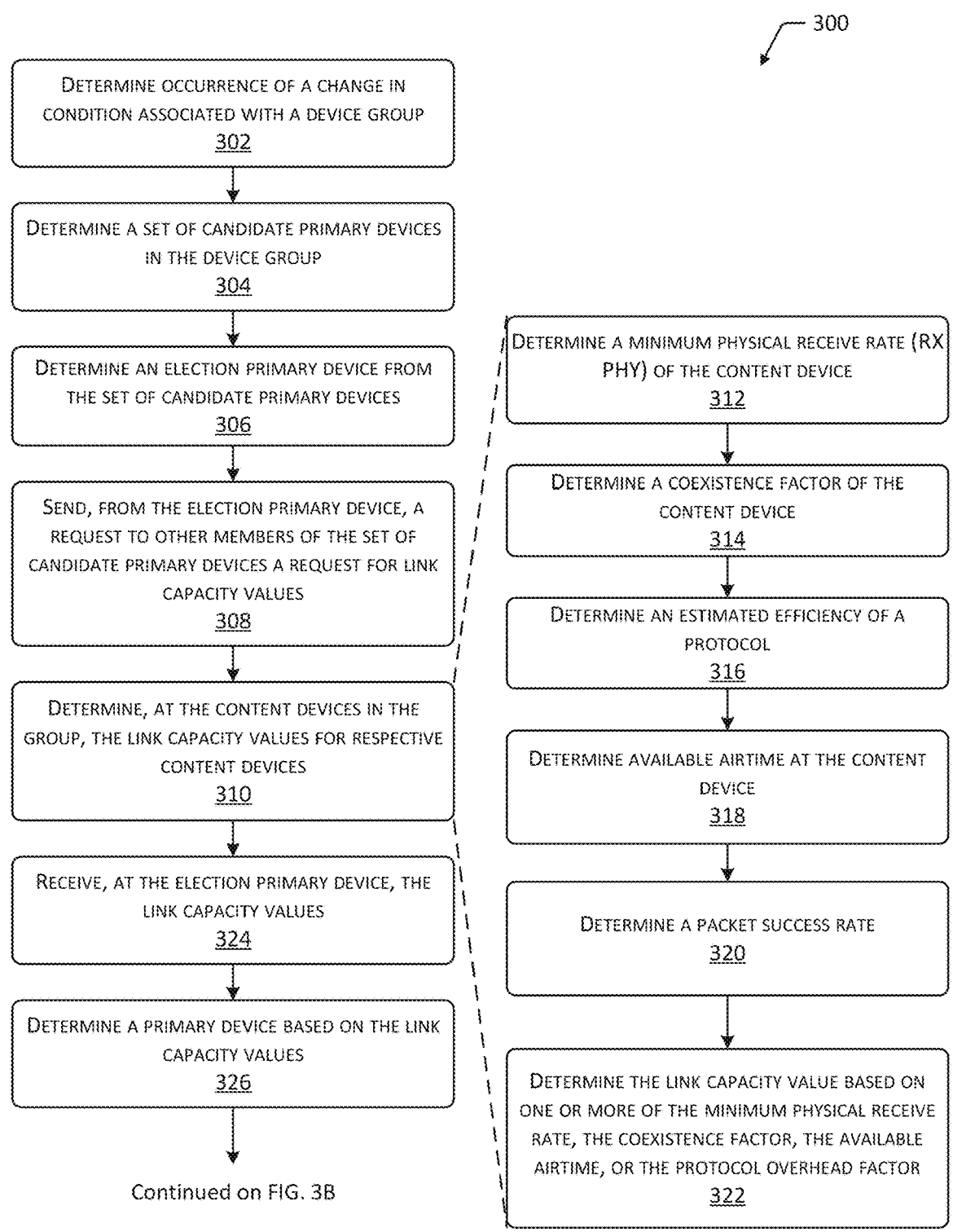
FIGS. 3A-3B are a flow diagram illustrating a method for determining a primary device and a transfer limit rate, according to one implementation.
Figure 3B:
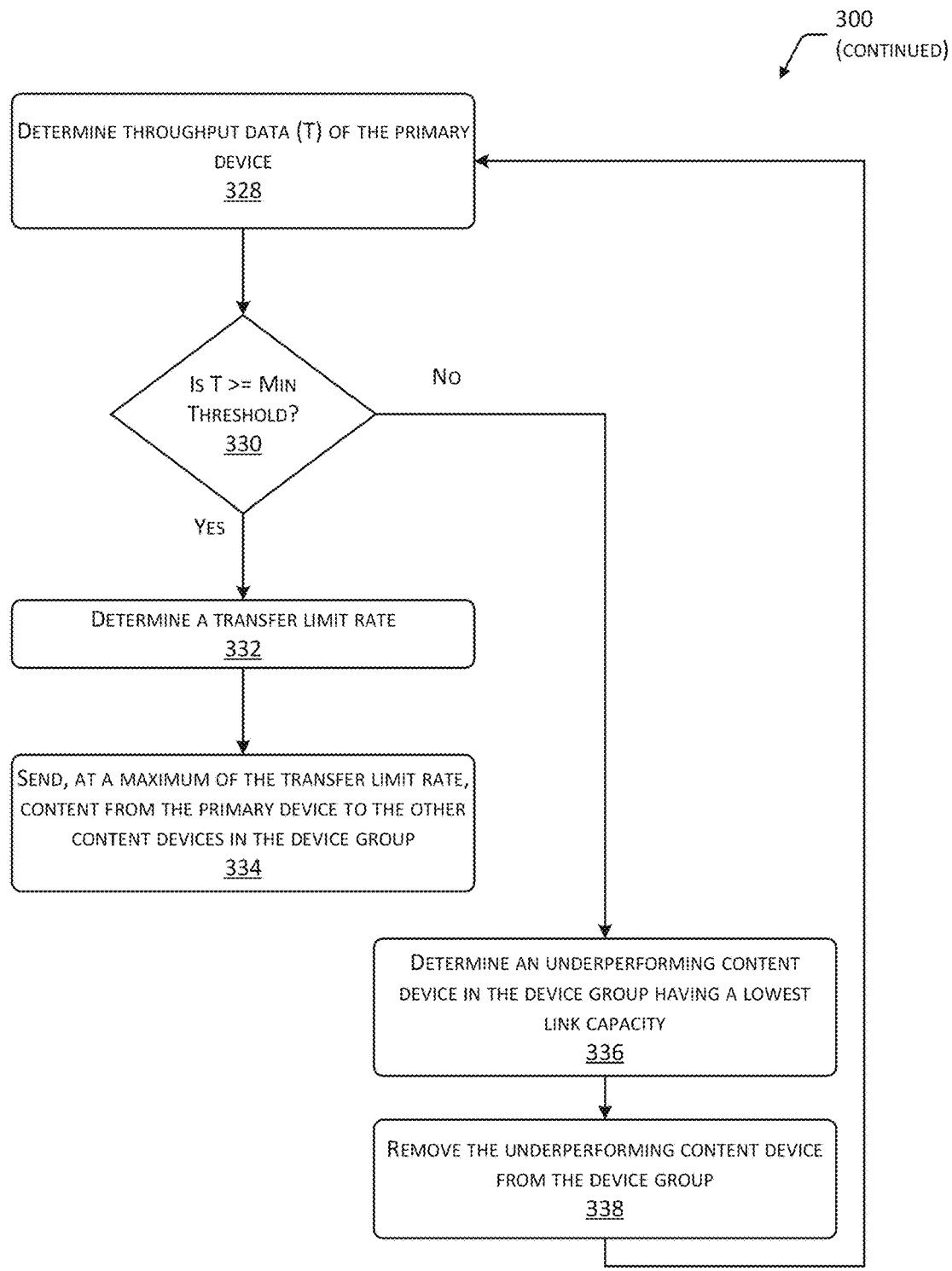

FIGS. 3A-3B are a flow diagram 300 illustrating a method for determining a primary device 122 and a transfer limit rate 150, according to one implementation. The method may be implemented at least in part by one or more of the content devices 106.

At 302 an occurrence of a change of one or more conditions associated with a device group 120 is determined. For example, a content device 106 may join or leave the WLAN, a presentation device 116 may be connected to a content device 106, network congestion may increase, and so forth. In some implementations, a user or automated process may initiate the following operations. For example, a server that is associated with managing the content devices 106 may initiate the following operations.

At 304 a set of candidate primary devices is determined in the device group 120. For example, the candidate primary devices may comprise a group of those content devices 106 that exhibit particular characteristics or capabilities, such as processor 126, memory 128, communication interfaces 130, installed modules, and so forth.

At 306 an election primary is determined from the set of candidate primary devices. For example, the election primary with the lowest internet protocol (IP) address may be selected as the election primary. In another example, the election primary having the most recent version of one or more modules may be selected.

At 308 the election primary sends a request for link capacity value(s) 136 to the other members of the set of candidate primary devices.

At 310 the content devices 106 that receive the request proceed to determine the link capacity value(s) 136. In one implementation, the determination of the link capacity value(s) 136 may include the operations of 312-322.

At 312 a minimum value of the physical receive rate (RX PHY) of the communication interface 130 used for the WLAN communication link 110 is determined. For example, one or more of the operating system, protocol stack, communication interface 130, and so forth may be interrogated to acquire the physical receive rate at several times. In some implementations, the lowest physical receive rate may be determined by computing the percentile for the physical receive rates as sampled at a particular interval for a particular period, such as every 10 seconds for the past hour. The minimum value may be designated as the value of the bottom $5^{th}$ percentile of these sampled physical receive rates. In other implementations, other percentile values may be used. By using the percentile or equivalent, a conservative value of the physical receive rate is determined.

At 314 a coexistence factor of the content device 106 is determined. For example, the coexistence factor data 138 may be accessed, and based on information such as the make, model, serial number, version, and so forth, the coexistence factor may be retrieved. The coexistence factor may be stored by the content device 106 in the memory 128.

At 316 an estimated efficiency of the protocol in use may be determined. The estimated efficiency is indicative of the amount of bandwidth that is consumed with operation of the network, excluding payload. For example, the protocol overhead factor may comprise a percentage of the number of bytes transmitted that are not payload. In some implementations, the estimated efficiency may be retrieved from a lookup table or other data structure based on an identification of a protocol that is in use.

At 318 an available airtime is determined at the content device 106. For example, the communication interface 130 of the content device 106 may be interrogated for the available airtime.

At 320 a packet success rate is determined. For example, the packet success rate may be indicative of a ratio of successful transmission of a packet.

At 322 the link capacity value(s) 136 are determined, based at least in part on one or more of the minimum physical receive rate, the coexistence factor, the available airtime, or the protocol overhead factor. For example, see Equation 1 as described above.

At 324 the election primary receives the link capacity values 136 from the content devices 106 in the set of candidate primary devices, as well as the link capacity value 136 for itself.

At 326 a primary device 122 is determined based on the link capacity values 136. For example, the candidate primary device that exhibits the largest link capacity may be elected as the primary device 122.

With the primary device 122 selected, the system proceeds to determine the transfer limit rate 150.

At 328 the throughput data 140 is determined for the primary device 122. The throughput data 140 is indicative of the rate of data transfer between the primary device 122 and the secondary devices 124 in the device group 120. The throughput data 140 may be determined based at least in part on the link capacity values 136. For example, see Equation 2 as described above.

At 330 if the throughput data 140 indicates a throughput value T that is greater than or equal to a minimum threshold, the method proceeds to 332. If not, the method proceeds to 336. In one implementation, the minimum threshold may be specified as two times the min content rate 146.

At 332 the transfer limit rate 150 is determined. For example, the transfer limit rate 150 may be set to twice the current content rate 148. The current content rate 148 may be determined based on the throughput data 140. For example, the current content rate 148 may be one-half of the throughput T as indicated in the throughput data 140. The transfer limit rate 150 may then be two times the current content rate 148.

At 334 the primary device 122 sends the content 104 to the secondary devices 124 in the device group 120 at a maximum of the transfer limit rate 150. For example, if the content device 106 is using a Linux-derived operating system, the "curl" utility may be used with the "limit-rate" option set to the transfer limit rate 150 to limit the rate of transfer of the content 104.

Returning to 330, if the throughput T is less than the minimum threshold, the method proceeds to 336. At 336 an underperforming content device 106 is determined. For example, the content device 106 that has a smallest link capacity, as indicated by the link capacity values 136, may be determined. At 338, the underperforming device is removed from the device group 120. Continuing the example, the content device 106 with the smallest link capacity may be removed from the device group 120 and will not receive content 104 from the primary device 122. As conditions change, during later operation of the method, the content device 106 may again be part of the device group 120. The method may then proceed to 328.

Figure 4:
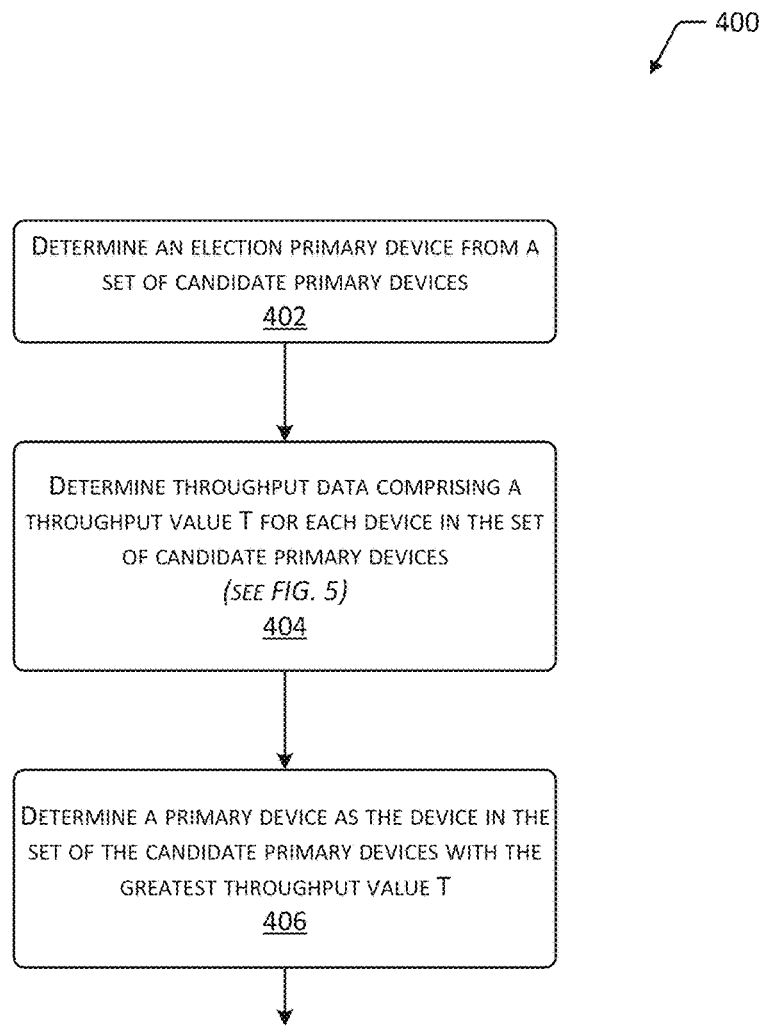
FIG. 4 is a flow diagram illustrating a method for determining a primary device based on throughput data for candidate devices, according to one implementation.

FIG. 4 is a flow diagram 400 illustrating a method for determining a primary device 122 based on throughput data 140 for candidate devices, according to one implementation. The method may be implemented at least in part by one or more of the content devices 106.

At 402 an election primary is determined from a set of candidate primary devices. For example, the method described in FIG. 3A at 304-306 may be used.

At 404 throughput data 140 comprising a throughput value T is determined for each device in the set of candidate primary devices. For example, each of the content devices 106 in the set of candidate primary devices may take a turn to determine their respective throughput data 140. This is discussed in more detail at least with regard to FIG. 5.

At 406 the primary device 122 is determined as the device in the set of the candidate primary devices with the greatest throughput value T. The primary device 122 may send an announcement that is indicative of its status as primary device 122, and the content device 106 acting as the election primary may discontinue election operations.

The method may then proceed to determine the transfer limit rate 150. For example, the method may proceed to FIG. 3B, at 328. Once the transfer limit rate 150 is determined, the content 104 may be sent to the secondary devices 124, as constrained by the transfer limit rate 150.

Figure 5:
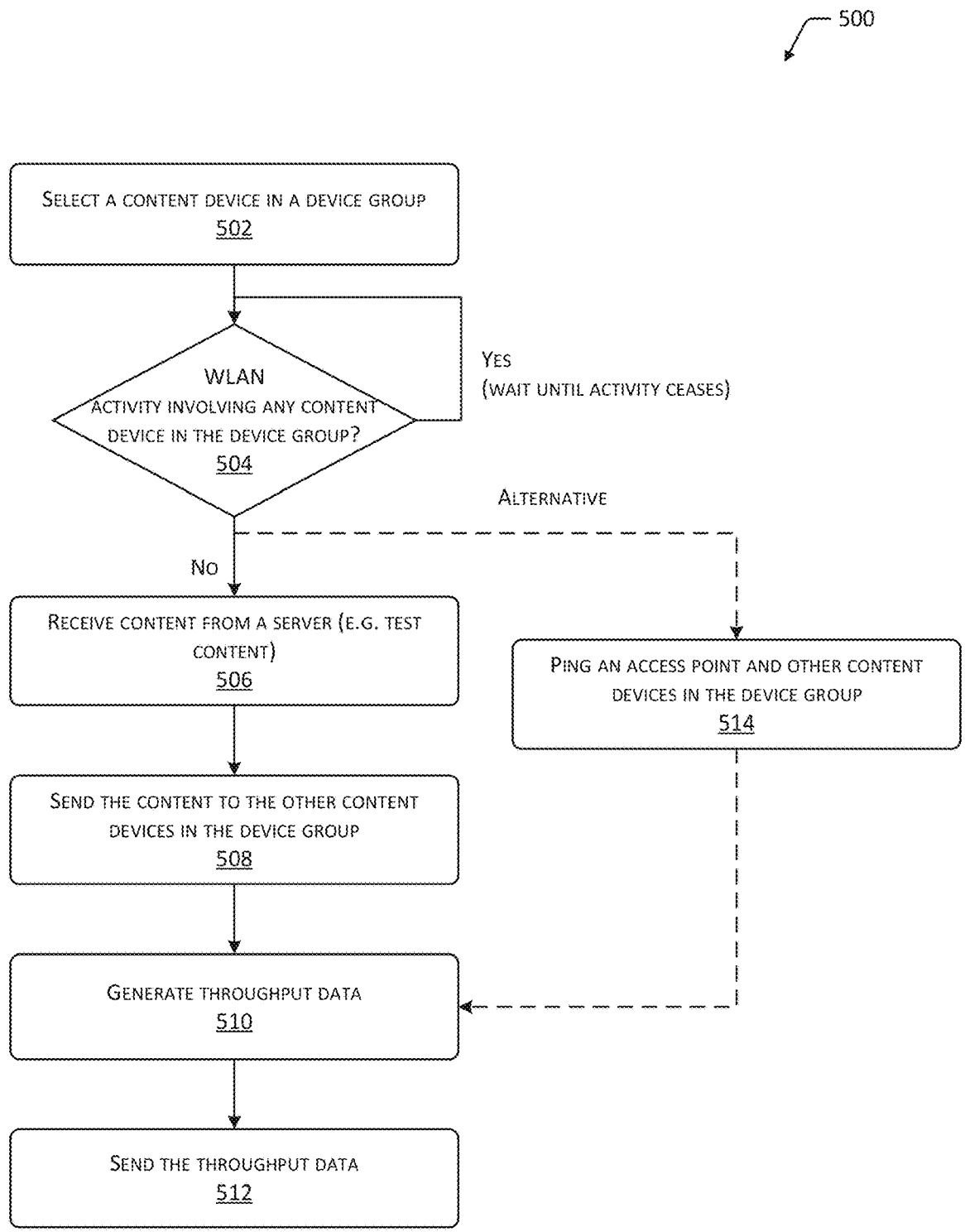
FIG. 5 is a flow diagram illustrating a method for determining throughput data indicative of throughput from one device to others in the device group, according to one implementation.

FIG. 5 is a flow diagram 500 illustrating a method for determining throughput data 140 indicative of throughput from one content device 106 to others in the device group 120, according to one implementation. The method may be implemented at least in part by one or more of the content devices 106.

At 502 a content device 106 is selected in the device group 120 or other set of devices. For example, if the primary election module 132 is determining the primary device 122, one of the set of candidate primary devices may be selected.

At 504 a determination is made as to whether there is any activity involving any content device 106 on the WLAN. If no activity, the method proceeds to 506. If activity is detected, the method may wait. For example, the method may wait until the activity ceases. In some implementations the determination may be made as to whether there is any activity on the WLAN, including other devices 112.

At 506 content 104 is received from the content server 102. In some implementations, the content 104 may be test content, such as "silent audio", such as audio data representative of silence.

At 508 the content 104 is sent to the other content devices 106 in the device group 120 using the WLAN communication links 110. For example, the WiFi communication interface 130 may be used to send the content 104.

At 510 the throughput data 140 is generated. For example, see Equation 2.

At 512 the throughput data 140 may be sent to a requesting content device 106. For example, devices other than the election primary may return the throughput data 140 to the election primary. The election primary would use its own throughput data 140 that is generated locally.

In some implementations an alternative technique may be used to determine the throughput data 140. As illustrated here, instead of operations 506 and 508, the process may proceed to 514.

At 514 the access point 108 and the other content devices 106 in the device group 120 are interrogated to determine an estimate of the throughput of the WLAN. The interrogation may comprise one device sending a set of internet control message protocol (ICMP) echo requests, or "pings", to a particular device, such as the content server 102, the other content devices 106, the access point 108, and so forth. A ping utility may be used to generate the pings.

The throughput data 140 may then be used to determine the transfer limit rate 150 and so forth. The use of pings to test the throughput and determine the transfer limit rate 150 are described in more detail with regard to FIGS. 6, 7, and 8.

Figure 6:
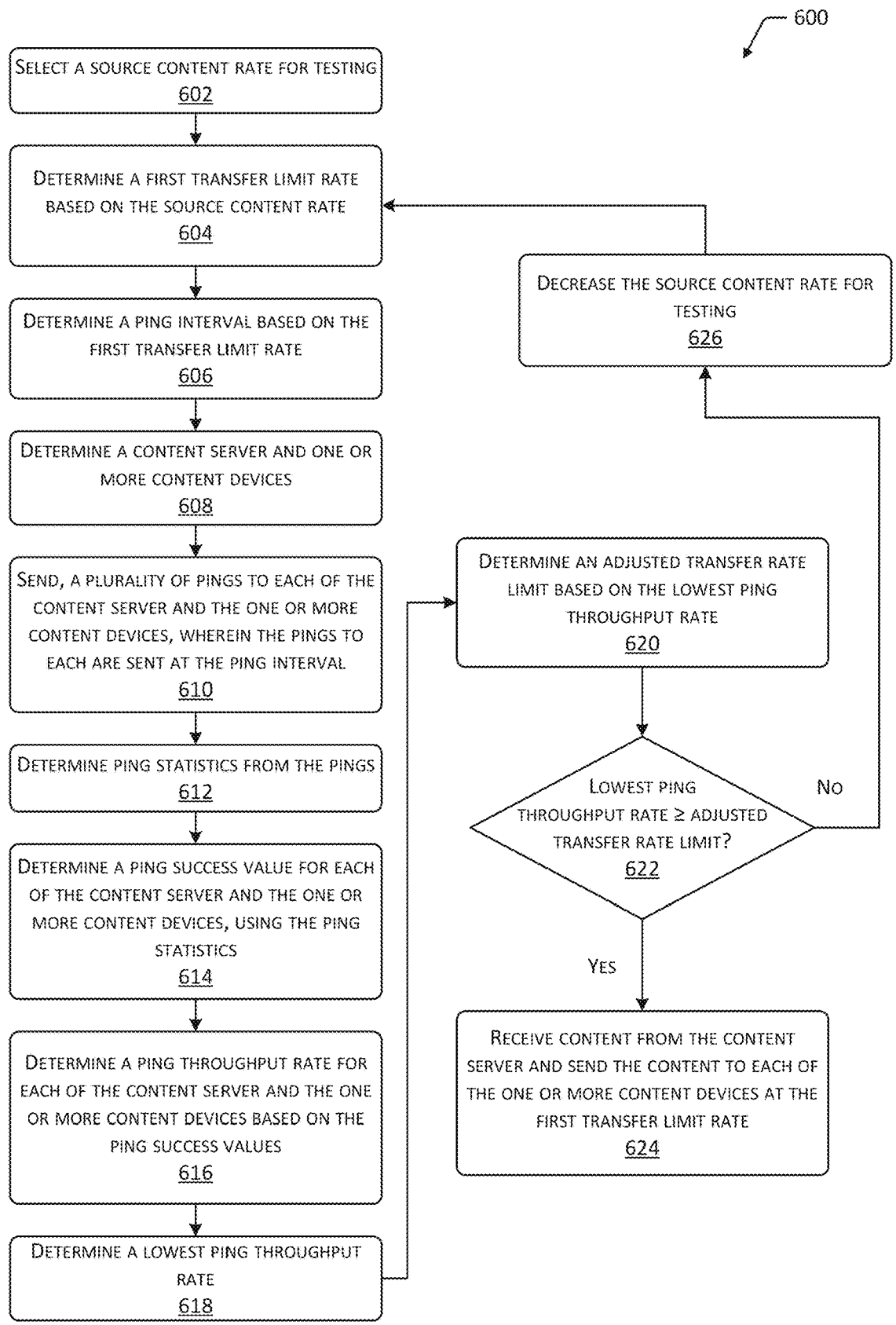
FIG. 6 is a flow diagram illustrating a method for using pings to determine a transfer limit rate, according to one implementation.

FIG. 6 is a flow diagram 600 illustrating a method for using pings to determine a transfer limit rate 150, according to one implementation. The method may be implemented at least in part by one or more of the content devices 106.

At 602 a source content rate 144 is selected for testing. For example, the testing may begin at a highest available source content rate 144, such as 320 kbps.

At 604 a first transfer limit rate 150 is determined based on the source content rate 144. For example, the first transfer limit rate 150 may be some multiple of the source content rate 144. For example, a source content rate 144 of 320 kbps would result in a first transfer limit rate 150 of 640 kbps. In other implementations, other multipliers or techniques may be used to determine the first transfer limit rate 150. For example, a lookup table may be used to retrieve a particular transfer limit rate 150 based on input of the source content rate 144.

At 606 a ping interval is determined based on the first transfer limit rate 150. Given that a ping packet will have a known payload size, by controlling how often a ping is sent, a specified amount of data may be sent for testing. This may be calculated as described in Equation 3:

$$\text{Ping Interval} = \frac{1}{\left(\frac{\text{Ping Payload Size}}{\text{First Transfer Limit Rate}}\right)}$$

where the ping interval specifies a time interval between sending pings to a specified destination, the ping payload size indicates the size (e.g. in bits) of a payload in the ping packet, and the first transfer limit rate 150 indicates the rate of data transfer to be tested.
Equation 3

The ping payload may comprise data that is previously determined, generated by a ping utility, and so forth. In some implementations, the ping payload size may be a default value, or may be specified to a particular value.

In some implementations, the first transfer limit rate 150 may be a specified multiple of the source content rate 144, such as four times the source content rate 144. Continuing the example above and using Equation 3, if the payload size of a ping packet is 1500 bytes or 12,000 bits. To produce 640 kbps of pings, the result is 640000/12000=53.3 pings/second. The interval is then 1/53.3 or approximately 18.8 ms.

At 608 a content server 102 and the one or more content devices 106 that are to be tested are determined. For example, the content server 102 that will provide content 104 and the secondary devices 124 are determined.

At 610 a plurality of pings are sent to each of the other devices in the device group 120. For example, pings are sent to the content server 102 and the one or more content devices 106. The pings to each of these destinations are sent at the ping interval determined above. Pings to different destinations may be sent in rapid succession or simultaneously. For example, if the content device 106(1) is performing this method, a first ping may be sent to the content server 102, a second ping to the content device 106(2), a third ping to the content device 106(3), and a fourth ping to the content device 106(4). Continuing the example, 18.8 ms later a fifth ping is sent to the content server 102, a sixth ping is sent to the content device 106(2), and so forth.

At 612 ping statistics are determined from the pings. For example, the ping statistics may include data indicative of number of pings sent, whether a ping was successful (a reply was received), a round trip time (RTT), a number of hops involved in routing the ping, and so forth. In some implementations, the ping statistics may include minimums, maximums, averages, and so forth. For example, an average RTT may be determined. For example, the RTT time is indicative of the elapsed time, such as in milliseconds (ms), between transmission of the ping to a destination and receipt of the response at a source that originated the ping.

At 614 at least a portion of the ping statistics may be used to determine a ping success value for the pings sent to each of the content server 102 and the one or more content devices 106. In one implementation, Equation 4 may be used to determine the ping success value.

$$\text{Ping Success Value} = \frac{\text{Number of received ping replies}}{\text{Total number of pings sent}}$$

where the number of received ping replies is indicative of the number of successful ping receipts and the total number of pings sent is indicative of the number of pings sent.
Equation 4

At 616, based on the ping success values, a ping throughput rate is determined for each of the content server 102 and the one or more content devices 106. In one implementation, Equation 5 may be used to determine the ping throughput rate.

$$\text{Ping Throughput Rate} = \frac{(\text{Ping Payload Size})(2)(\text{Ping Success Value})}{RTT}$$

where the RTT may comprise the average RTT or the maximum RTT for the pings.
Equation 5

At 618 a lowest ping throughput rate is determined. For example, in the configuration as illustrated in FIG. 1, this method would result in four ping throughput rates, one each for the content server 102 and content devices 106(2)-(4). The lowest ping throughput rate comprises the minimum of the ping throughput rates.

At 620 an adjusted transfer limit rate 150 is determined based on the lowest ping throughput rate. In one implementation, Equation 6 may be used to determine the adjusted transfer limit rate 150.

$$\text{Adjusted Transfer Limit Rate} = (\text{Pass Coefficient})(\text{Ping Throughput Rate}_{LOWEST})$$

where the Pass Coefficient is a predetermined value.
Equation 6

In some implementations the Pass Coefficient may be less than or equal to 1. The Pass Coefficient may be determined based on testing to determine a minimum expected value of packets of content 104 that are expected to be successfully transferred to the receiving device.

At 622 a determination is made as to whether the lowest ping throughput rate is greater than or equal to the adjusted transfer limit rate 150. If yes, the process proceeds to 624. If no, the process proceeds to 626.

At 624 the first transfer limit rate 150 is used for transfer of content 104. For example, the content 104 may be received from the content server 102 at the first transfer limit rate 150 and corresponding content rate, and the content 104 may then be sent to the one or more content devices 106 at the first transfer limit rate 150. In another implementation, the content 104 may be stored locally at the primary device 122 and sent at the first transfer limit rate 150.

At 626 the source content rate 144 is decreased and the process returns to 604 for additional testing. For example, if a first iteration of the method used a source content rate 144 of 320 kbps, the source content rate 144 for the second iteration may use a next lowest available increment, such as 128 kbps as the source content rate 144. The method may thus result in ping testing being performed at successively lower levels. In some implementations the min content rate 146 may be the lowest content rate tested.

Figure 7:
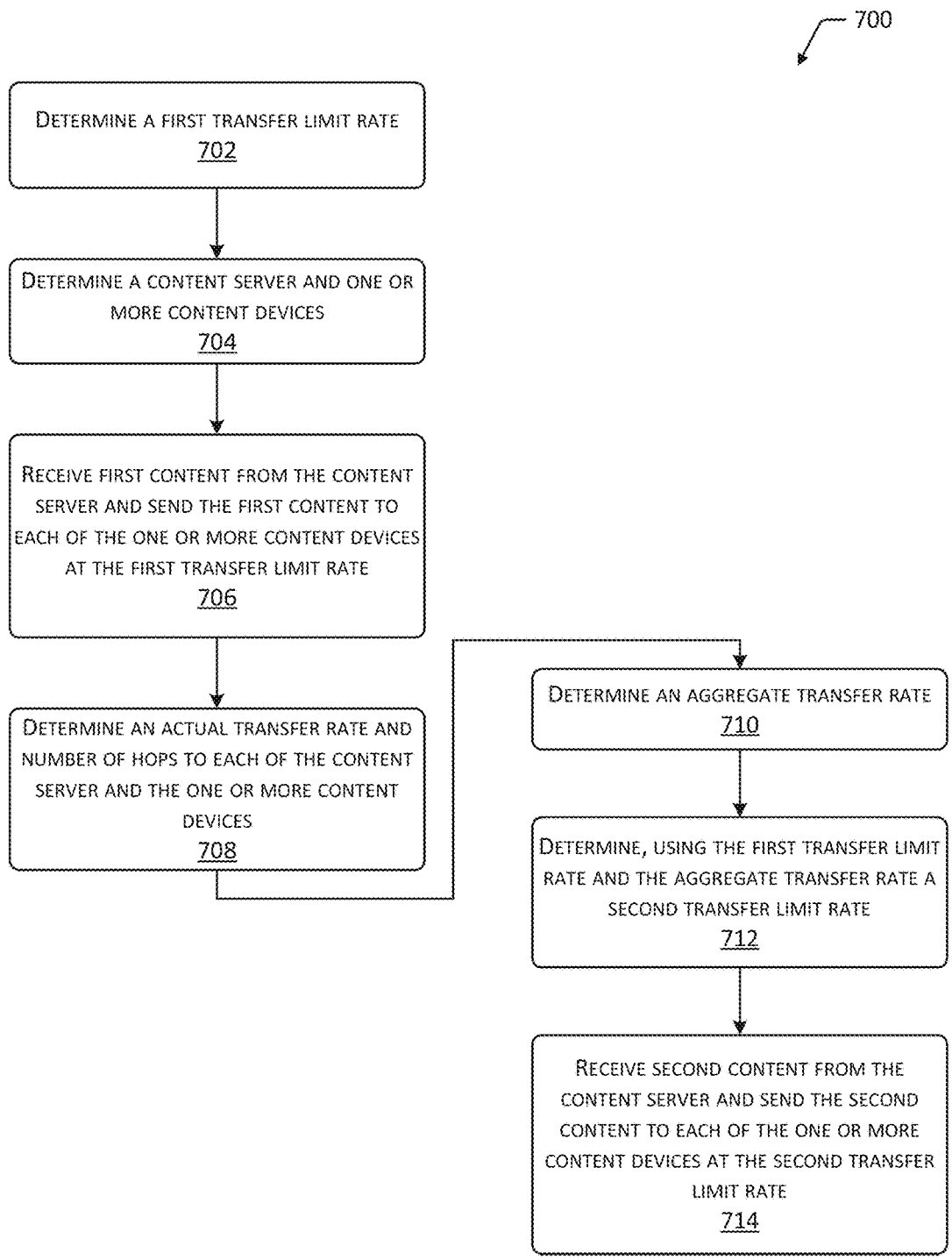
FIG. 7 is a flow diagram illustrating a method for using an aggregate transfer rate to determine a transfer limit rate, according to one implementation.

FIG. 7 is a flow diagram 700 illustrating a method for using an aggregate transfer rate to determine a transfer limit rate 150, according to one implementation. The method may be implemented at least in part by one or more of the content devices 106.

At 702 a first transfer limit rate 150 is determined. For example, the transfer limit rate 150 may be associated with a particular source content rate 144, such as twice the source content rate 144. In other implementations, the first transfer limit rate 150 may be a specified value, such as 1.5 Mbps.

At 704 a content server 102 and the one or more content devices 106 that are to be tested are determined. For example, the content server 102 that will provide content 104 and the secondary devices 124 are determined.

At 706 first content 104 is received from the content server 102 and is sent to each of the one or more or more content devices 106 in the device group 120 at the first transfer limit rate 150. The first content 104 may comprise non-presentation or presentation content, or a portion thereof. For example, non-presentation content may comprise silent audio content in which there is data representative of a sound, but the amplitude for presentation is zero. In comparison, presentation content produces output that may be perceived by a user. For example, the presentation content may comprise audio data of at least a portion of a song or audiobook. In some implementations, the first content 104 may comprise audio requested by a user.

At 708 an actual transfer rate and number of hops are determined for each of the devices in the device group 120 during transfer of at least a portion of the first content 104. For example, the actual transfer rate of data from the content server 102 to the content device 106(1), and from the content device 106(1) to each of the content devices 106(2)-(4) may be determined. The number of hops comprises data indicative of a number of network nodes between a source and a destination.

At 710 an aggregate transfer rate is determined. The aggregate transfer rate is a sum of the actual transfer rates. In one implementation, the aggregate transfer rate may be calculated using Equation 7.

Aggregate Transfer Rate=Σ(Actual Transfer Rate($k$))
(Number of Hops($k$))

where k is a device in the device group 120.
Equation 7

At 712 the first transfer limit rate 150 and the aggregate transfer rate are used to determine a second transfer limit rate 150. The relationship between the first transfer limit rate 150, the aggregate transfer rate, and the second transfer limit rate 150 may be expressed as a graph, lookup table, equation, and so forth. The relationship may be determined based on one or more of testing or simulation. For example, during otherwise idle times, the primary device 122 may use silent audio to test and generate data that relates a particular transfer limit rate 150 that is being tested to a particular aggregate transfer rate.

In some implementations, the relationship may be modified based on data obtained during operation of the content device 106. For example, a graph may have several curves, each curve providing a relationship between aggregate transfer rates and transfer limit rates 150. Continuing the example, one curve may correspond to a congested network, another curve to a non-congested network, and another curve to a network with little or no congestion. The curve that is closest to or less than a particular point indicated by an aggregate transfer rate and a transfer limit rate 150 may be determined. Each curve exhibits an inflection point in which the relationship between the aggregate transfer rate and the transfer limit rate 150 transitions from a linear relationship to a non-linear relationship. The inflection point of that curve is then used to determine a second transfer limit rate 150 that may subsequently be used.

The second transfer limit rate 150 associated with the inflection point is highly likely to provide adequate transfer of the content 104 on the network to provide for presentation of content 104 with problems such as dropouts, stutters, and so forth. For example, if the content 104 is audio, a stutter may occur when an individual transmission control protocol (TCP) connection exhibits a low instantaneous throughput, resulting in an empty buffer during playback.

At 714 second content 104 is received from the content server 102 and sent to each of the one or more content devices 106 in the device group 120 at the second transfer limit rate 150. In some implementations, the second content 104 may comprise a portion of the same content as the first content 104. For example, the first content 104 may comprise a first portion of a song while the second content 104 comprises a second portion of the same song.

Figure 8:
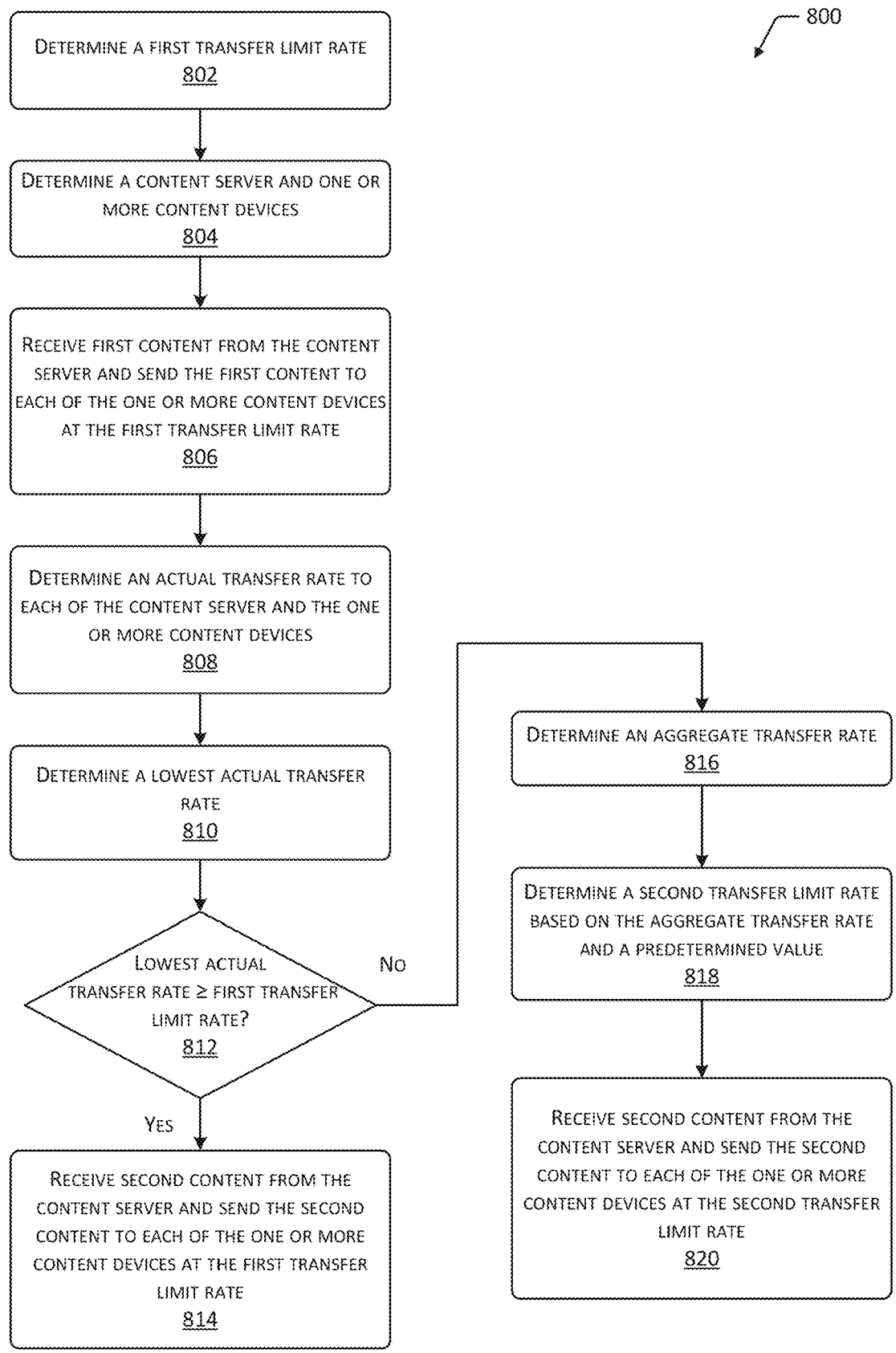
FIG. 8 is a flow diagram illustrating a method for using an aggregate transfer rate and a predetermined value to determine a transfer limit rate, according to one implementation.

FIG. 8 is a flow diagram 800 illustrating a method for using an aggregate transfer rate and a predetermined value to determine a transfer limit rate 150, according to one implementation. The method may be implemented at least in part by one or more of the content devices 106.

At 802 a first transfer limit rate 150 is determined. The first transfer limit rate 150 may be determined based on one or more of the previously described methods, or may be a predetermined value. For example, the transfer limit rate 150 may be associated with a particular source content rate 144, such as twice the source content rate 144. In other implementations, the first transfer limit rate 150 may be a specified value, such as 1.5 Mbps.

At 804 a content server 102 and the one or more content devices 106 that are to be tested are determined. For example, the content server 102 that will provide content 104 and the secondary devices 124 are determined.

At 806 first content 104 is received from the content server 102 and is sent to each of the one or more or more content devices 106 in the device group 120 at the first transfer limit rate 150. As described above, the first content 104 may comprise non-presentation or presentation content. For example, non-presentation content may comprise silent audio content in which there is data representative of a sound, but the amplitude for presentation is zero. In comparison, presentation content produces output that may be perceived by a user. For example, the presentation content may comprise audio data for a song or audiobook. In some implementations, the first content 104 may comprise audio requested by a user.

At 808 an actual transfer rate is determined for each of the devices in the device group 120 during transfer of at least a portion of the first content 104. For example, the actual transfer rate of data from the content server 102 to the content device 106(1), and from the content device 106(1) to each of the content devices 106(2)-(4) may be determined.

At 810 a lowest actual transfer rate is determined. For example, in the configuration as illustrated in FIG. 1, this method would result in four connections, one between the content device 106(1) and the content server 102 and each of the content devices 106(2)-(4). The lowest actual transfer rate may be the actual transfer rate that exhibits a minimum value.

At 812 a determination is made as to whether the lowest actual transfer rate is greater than or equal to the first transfer limit rate 150. If yes, the method proceeds to 814. If no, the method proceeds to 816.

At 814 second content 104 is received from the content server 102 and sent to each of the one or more content devices 106 in the device group 120 at the first transfer limit rate 150. In another implementation, the content 104 may be stored locally at the primary device 122 and sent at the first transfer limit rate 150.

At 816 an aggregate transfer rate is determined. The aggregate transfer rate is sum of actual transfer rates associated with the first content 104. In one implementation, the aggregate transfer rate may be calculated using Equation 7 as described above.

At 818 a second transfer limit rate 150 is determined based on the aggregate transfer rate and a predetermined value. In some implementations, the predetermined value may comprise a value that is between 0.5 and 0.6. For example, the predetermined value may be 0.55. In one implementation, the second transfer limit rate 150 may be determined using Equation 8.

$$\text{Second Transfer Limit Rate} = \frac{(\text{Aggregate Transfer Rate})(\text{Predetermined Factor})}{(2N - 1)}$$

where N is the number of devices in the device group 120.
Equation 8

The predetermined value may be retrieved from previously stored data using one or more parameters. For example, a lookup table may specify predetermined values for various combinations of types of data transfer protocols and a count of the devices in the device group 120. Continuing the example, the types of data transfer protocols may include transmission control protocol (TCP), user datagram protocol (UDP), stream control transmission protocol (SCTP), and so forth. In some implementations, the data transfer protocols may operate at a transport layer of the Open Systems interconnection (OSI) model. In some implementations, the count of the devices in the device group 120 may include the content server 102.

At 820 second content 104 is received from the content server 102 and sent to each of the one or more content devices 106 in the device group 120 at the second transfer limit rate 150. In another implementation, the content 104 may be stored locally at the primary device 122 and sent at the second transfer limit rate 150.

Figure 9:
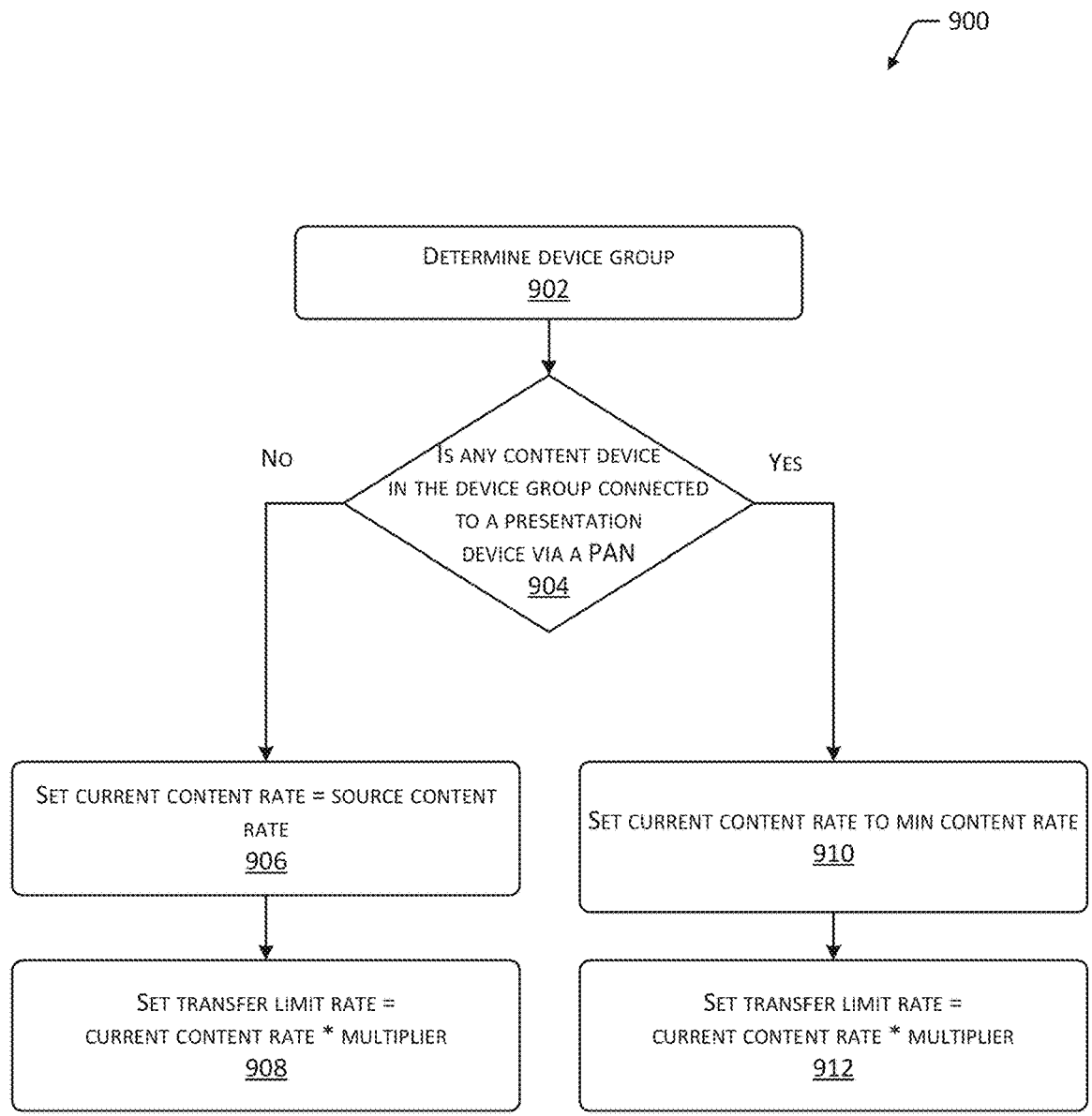
FIG. 9 is a flow diagram illustrating a method of determining a transfer limit rate, according to one implementation.

FIG. 9 is a flow diagram 900 illustrating a method of determining a transfer limit rate 150, according to one implementation. The method may be implemented at least in part by one or more of the content devices 106.

At 902 the device group 120 is determined. For example, the device group 120 may comprise those content devices 106 that are able to communicate with one another via the WLAN communication links 110 and the access point 108. The device group 120 may comprise those devices which are on a common subnetwork.

At 904 a determination is made as to whether any of the content devices 106 in the device group 120 are connected to a presentation device 116 via a PAN. For example, the primary device 122 may receive device status data 134 from the secondary devices 124 that indicates whether a Bluetooth speaker is connected via a PAN communication link 114. If none of the content devices 106 have a connected presentation device 116, the method may proceed to 906, otherwise the method may proceed to 910.

At 906 the current content rate 148 is set to the source content rate 144. For example, if the content server 102 is able to deliver the content 104 with an encoding bitrate of 320 kbps, the current content rate 148 is 320 kbps. In some implementations, the highest source content rate 144 that is available from the content server 102 may be used.

At 908 the transfer limit rate 150 is set to a multiple of the current content rate 148. For example, the transfer limit rate 150 may be twice the current content rate 148.

Returning to 904, if a presentation device 116 is connected to one of the content devices 106 via a PAN communication link 114, at 910 the current content rate 148 is set to the min content rate 146.

At 912 the transfer limit rate 150 is then set to a multiple of the current content rate 148. For example, the transfer limit rate 150 may be twice the current content rate 148.

Figure 10:
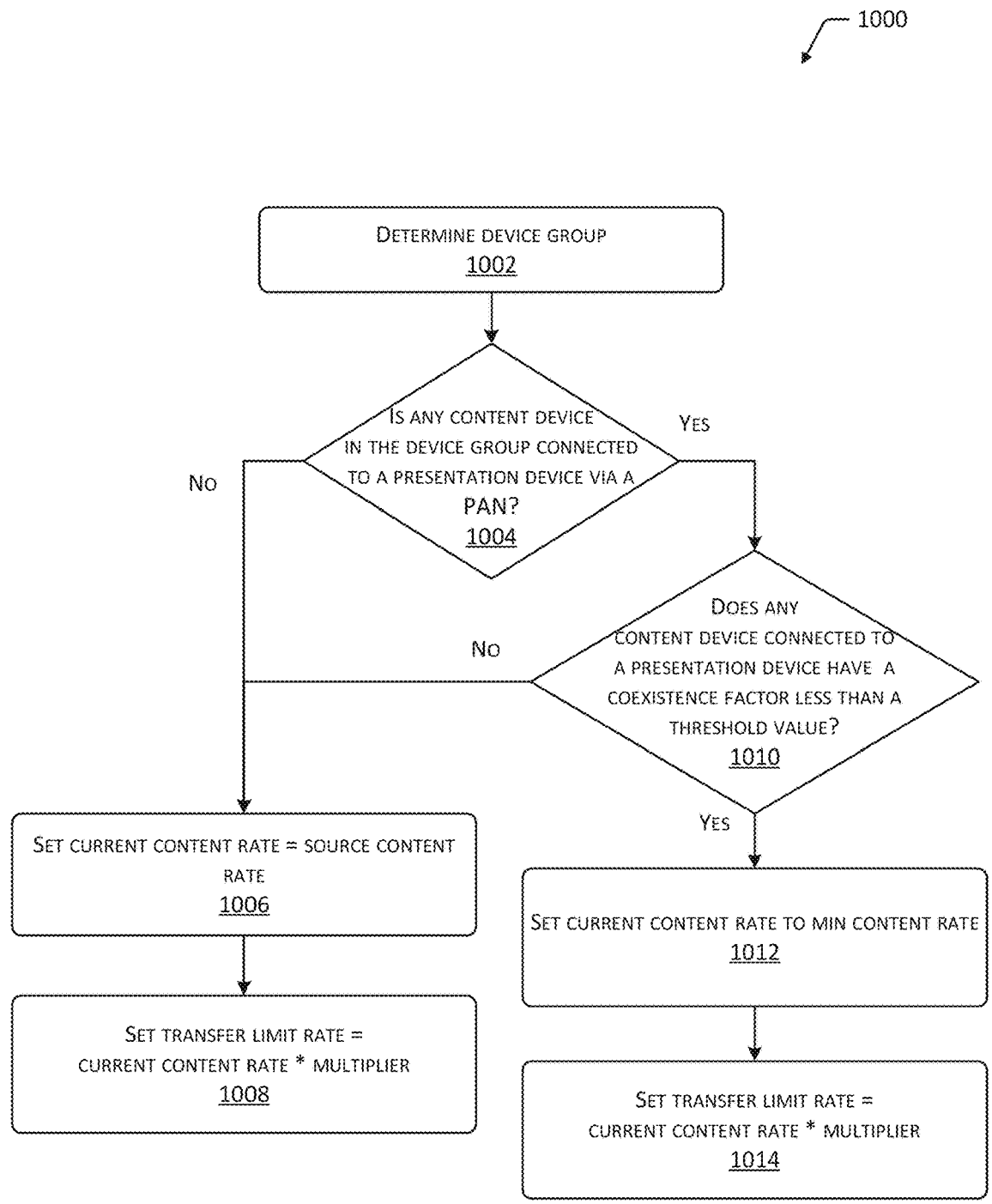
FIG. 10 is a flow diagram of another method of determining a transfer limit rate, according to one implementation.

FIG. 10 is a flow diagram 1000 of another method of determining a transfer limit rate 150, according to one implementation. The method may be implemented at least in part by one or more of the content devices 106.

At 1002 the device group 120 is determined. For example, the device group 120 may comprise those content devices 106 that are able to communicate with one another via the WLAN communication links 110 and the access point 108. The device group 120 may comprise those devices which are on a common subnetwork.

At 1004 a determination is made as to whether any of the content devices 106 in the device group 120 are connected to a presentation device 116 via a PAN. For example, the primary device 122 may receive device status data 134 from the secondary devices 124 that indicates whether a Bluetooth speaker is connected via a PAN communication link 114. If none of the content devices 106 have a connected presentation device 116, the method may proceed to 1006, otherwise the method may proceed to 1010.

At 1006 the current content rate 148 is set to the source content rate 144. For example, if the content server 102 is able to deliver the content 104 with an encoding bitrate of 320 kbps, the current content rate 148 is 320 kbps. In some implementations, the highest source content rate 144 that is available from the content server 102 may be used.

At 1008 the transfer limit rate 150 is set to a multiple of the current content rate 148. For example, the transfer limit rate 150 may be twice the current content rate 148.

Returning to 1004, if any content device 106 in the device group 120 is connected to a presentation device 116, the method proceeds to 1010. At 1010 a determination is made as to whether any of the content devices 106 that are connected to a presentation device 116 have a coexistence factor less than a threshold value. If no, the method proceeds to 1006. If yes, the method proceeds to 1012.

At 1012 the current content rate 148 is set to the min content rate 146. At 1014 the transfer limit rate 150 is set to a multiple of the current content rate 148. For example, the transfer limit rate 150 may be twice the current content rate 148.

Figure 11:
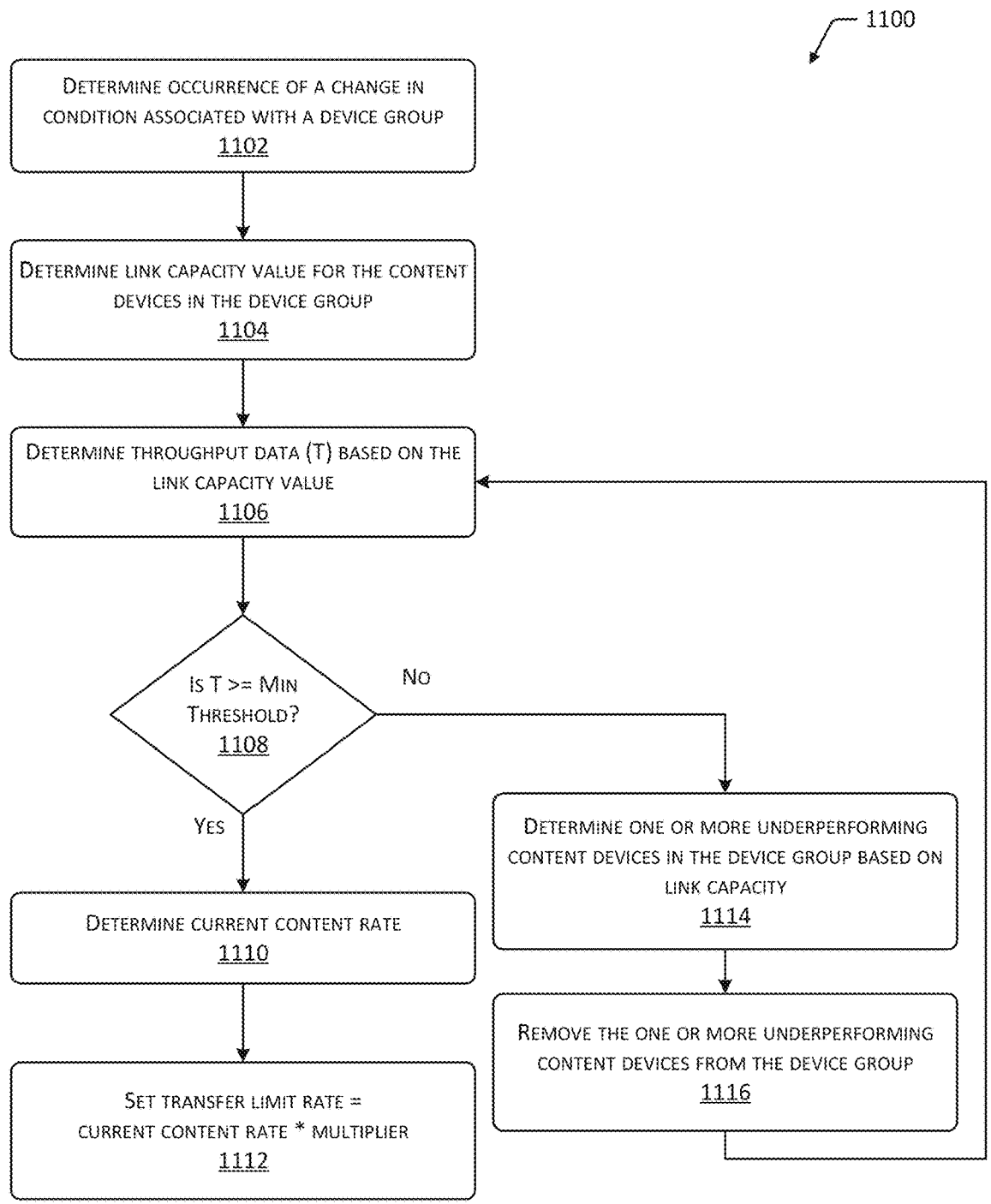
FIG. 11 is a flow diagram illustrating another method of determining a transfer limit rate, according to one implementation.

FIG. 11 is a flow diagram 1100 illustrating another method of determining a transfer limit rate 150, according to one implementation. The method may be implemented at least in part by one or more of the content devices 106.

At 1102 an occurrence of a change of one or more conditions associated with a device group 120 is determined. For example, a content device 106 may join or leave the WLAN, a presentation device 116 may be connected to a content device 106, network congestion may increase, the channels used by the WLAN communication link 110 may change, and so forth.

At 1104 the link capacity values 136 are determined for the content devices 106 in the device group 120. For example, Equation 1 may be used to determine the link capacity Lx for each of the content devices 106.

At 1106 the throughput data 140 is determined based on the link capacity values 136. For example, the primary device 122 may receive the link capacity values 136 from the secondary devices 124 and determine the throughput using Equation 2.

At 1108 if the throughput data 140 indicates a throughput value T that is greater than or equal to a minimum threshold, the method proceeds to 1110. If not, the method proceeds to 1114. In one implementation, the minimum threshold may be specified as two times the min content rate 146.

At 1110 the current content rate 148 is determined. In one implementation, a first threshold may be determined that is one-half of the throughput T. The current content rate 148 may be selected from a set of possible content rates, such as source content rates 144 that are available, that is less than and also closest in value to the first threshold.

At 1112 the transfer limit rate 150 is set to a multiple of the current content rate 148. For example, the transfer limit rate 150 may be twice the current content rate 148.

Returning to 1108, if the throughput is less than the minimum threshold, the method proceeds to 1114. At 1114 an underperforming content device 106 is determined. For example, the content device 106 that has a smallest link capacity, as indicated by the link capacity values 136, may be determined. At 1116, the underperforming device is removed from the device group 120. Continuing the example, the content device 106 with the smallest link capacity may be removed from the device group 120 and will not receive content 104 from the primary device 122. The method may then proceed to 1106. As conditions change, during later operation of the method, the content device 106 may again be part of the device group 120.

Figure 12:
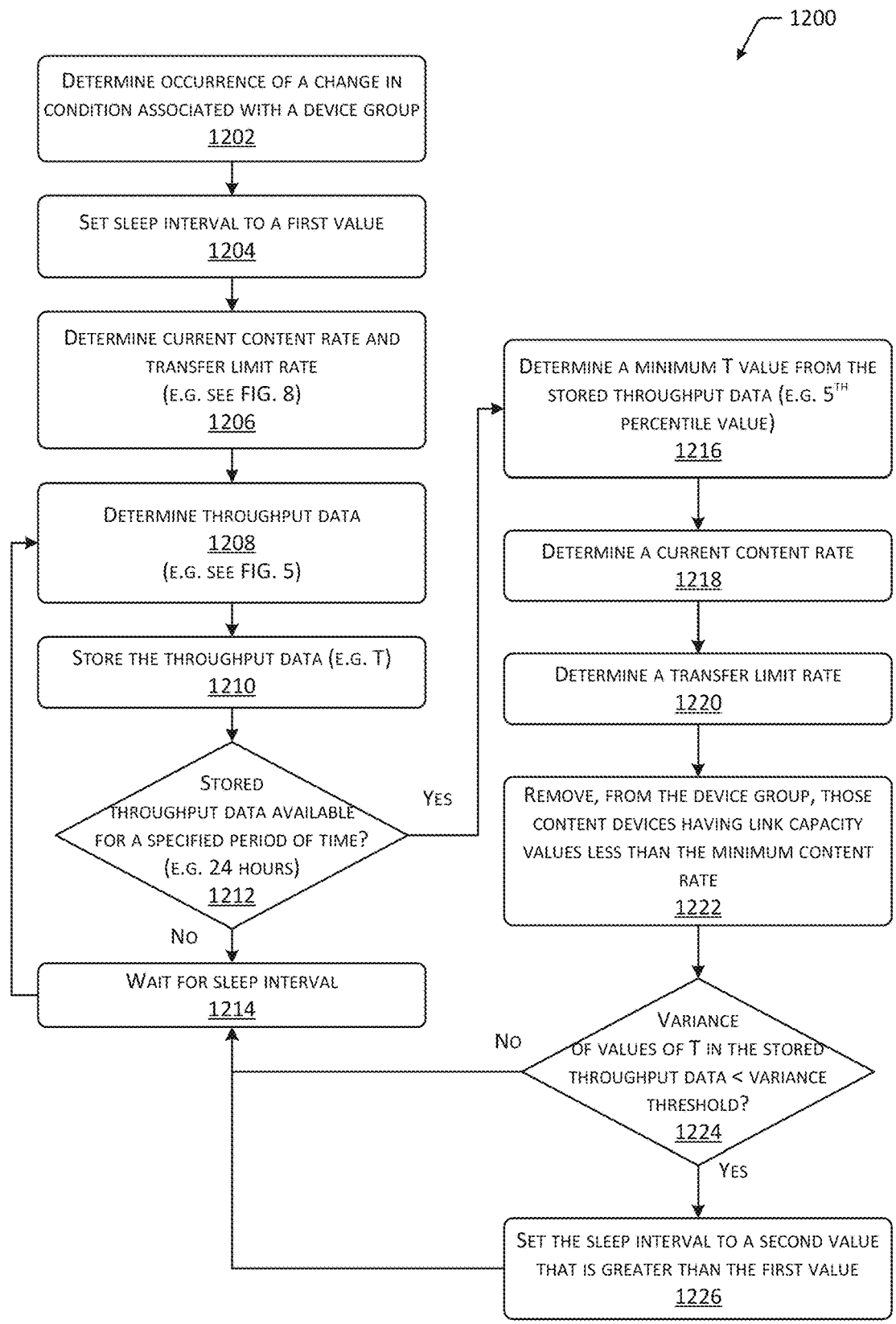
FIG. 12 is a flow diagram illustrating another method of determining a transfer limit rate using throughput data acquired over a period of time, according to one implementation.

FIG. 12 is a flow diagram 1200 illustrating another method of determining a transfer limit rate 150 using throughput data 140 acquired over a period of time, according to one implementation. The method may be implemented at least in part by one or more of the content devices 106.

At 1202 an occurrence of a change of one or more conditions associated with a device group 120 is determined.

At 1204 a sleep interval is set to a first value. For example, the first value may be 10 minutes.

At 1206 the current content rate 148 and the transfer limit rate 150 are determined. For example, see FIG. 11.

At 1208 throughput data 140 is determined. For example, see FIG. 5.

At 1210 the throughput data 140 obtained is stored. For example, the throughput data 140 determined at a particular time is stored in the memory 128.

At 1212 a determination is made as to whether the stored throughput data 140 is available for a specified period of time. If no, the method proceeds to 1214. If yes, the method proceeds to 1216. At 1214, the method waits for the sleep interval, and then proceeds to 1208 where throughput data 140 is again determined.

At 1216 a minimum throughput value Tmin is determined from the stored throughput data 140. For example, Tmin may be the value of the bottom $5^{th}$ percentile of throughput values.

At 1218 the current content rate 148 is determined. In one implementation, a first threshold may be determined that is one-half of the minimum throughput Tmin. The current content rate 148 may be selected from a set of possible content rates, such as source content rates 144 that are available, that is less than and also closest in value to the first threshold.

At 1220 the transfer limit rate 150 is determined. For example, the transfer limit rate 150 is set to twice the current content rate 148.

At 1222 those content devices 106 that have link capacity less than the min content rate 146 may be removed from the device group 120. For example, if the min content rate 146 is 128 kbps, and the link capacity for content device 106(3) is 97 kbps, the content device 106(3) will be dropped from the device group 120.

At 1224 a determination is made as to whether the variance of values of T in the stored throughput data 140 is less than a variance threshold. If no, the method proceeds to 1214 and waits for the sleep interval before determining throughput data 1208 again. If yes, the method proceeds to 1226.

At 1226 the sleep interval is set to a second value that is greater than the first value. For example, if the first value was 10 minutes, the second value may be 60 minutes. The method then proceeds to 1214.

By using this determination at 1224, if the system 100 is remaining relatively stable, the frequency of performing the testing to determine throughput data 1208 is reduced, conserving network bandwidth.

Figure 13:
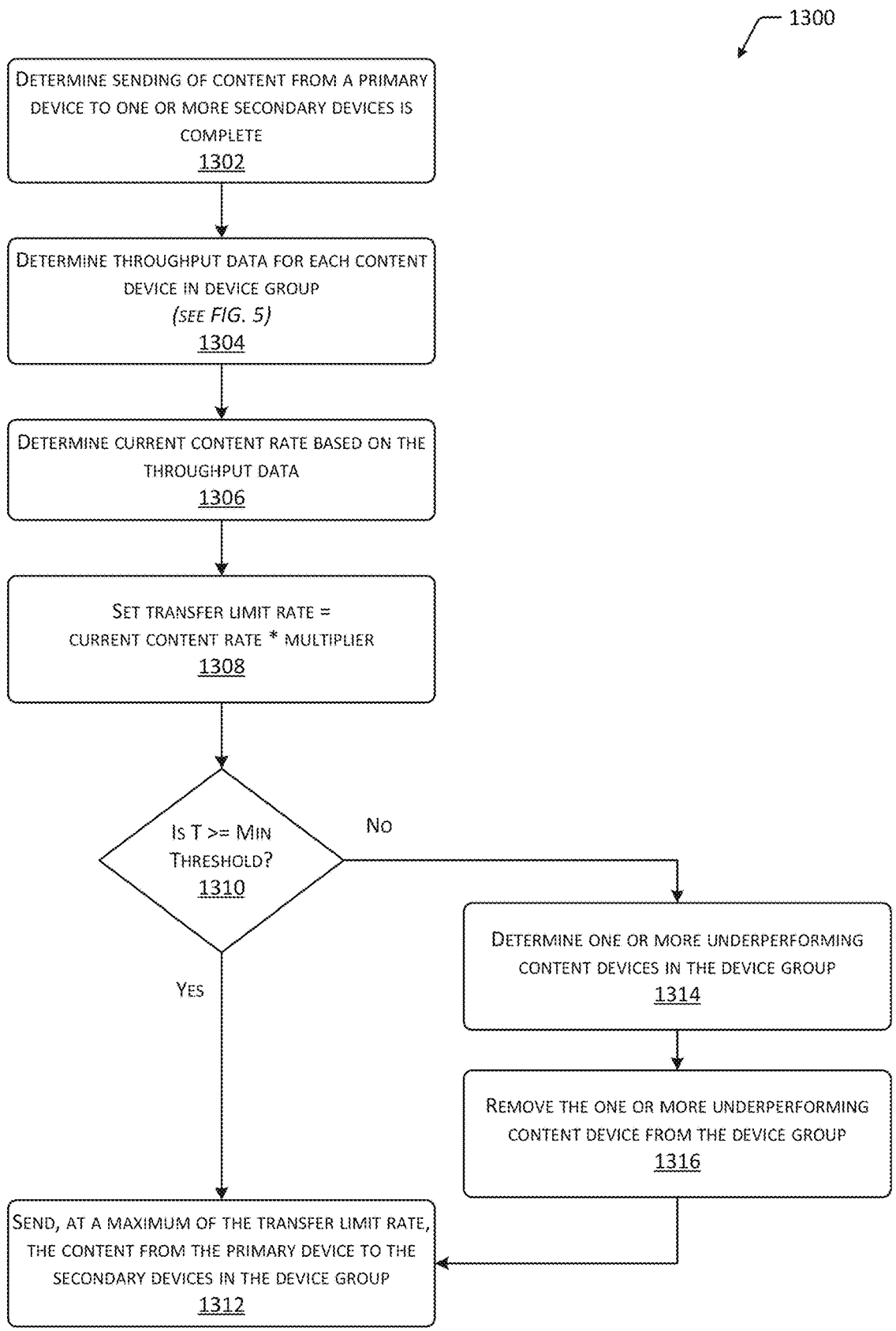
FIG. 13 is a flow diagram illustrating another method of determining a transfer limit rate after sending content, according to one implementation.

FIG. 13 is a flow diagram 1300 illustrating another method of determining a transfer limit rate 150 after sending content 104, according to one implementation. The method may be implemented at least in part by one or more of the content devices 106.

At 1302 a determination is made that the sending of content 104 from the primary device 122 to the one or more secondary devices 124 is complete. For example, if the content 104 comprises audio of a song, the last packet of audio data for that song may be sent. That last packet may then be stored in the buffers of the receiving secondary devices 124 until used during presentation.

At 1304 while the content devices 106 are completing presentation of the content 104 using the data stored in buffer(s), the throughput data 140 for each content device 106 in the device group 120 is determined. For example, see FIG. 5.

At 1306 the current content rate 148 is determined based on the throughput data 140. In one implementation, a first threshold may be determined that is some fraction, such as one-half, of the throughput T. The current content rate 148 may be selected from a set of possible content rates, such as source content rates 144 that are available, that is less than and also closest in value to the first threshold.

At 1308 the transfer limit rate 150 is set to some value greater than the current content rate 148. In one implementation, the transfer limit rate 150 may be a multiple of the current content rate 148. For example, the transfer limit rate 150 may be twice the current content rate 148.

At 1310 if the throughput data 140 indicates a throughput value T that is greater than or equal to a minimum threshold, the method proceeds to 1312. If not, the method proceeds to 1314. In one implementation, the minimum threshold may be specified as two times the min content rate 146.

At 1312 the primary device 122 sends the content 104 to the secondary devices 124 in the device group 120 at a maximum of the transfer limit rate 150.

Returning to 1310, if the throughput T is less than the minimum threshold, the method proceeds to 1314. At 1314 an underperforming content device 106 is determined. For example, the content device 106 that has a smallest link capacity, as indicated by the link capacity values 136, may be determined. At 1316, the underperforming device is removed from the device group 120. Continuing the example, the content device 106 with the smallest link capacity may be removed from the device group 120 and will not receive content 104 from the primary device 122. The method may then proceed to 1312.

The method allows the system 100 to rapidly adjust to changes. For example, the method may be performed between the transfer of content 104 such as songs, videos, and so forth.

The methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A first audio device comprising:
   a first wireless local area network (WLAN) interface;
   a first Bluetooth interface coupled to a first wireless speaker;
   a first memory storing first computer-executable instructions; and
   a first hardware processor to execute the first computer-executable instructions to:
   determine a first link capacity value of a first communication link between the first audio device and a second audio device;
   receive, from the second audio device via the first WLAN interface, a second link capacity value of a second communication link between the second audio device and the first audio device via a second WLAN interface of the second audio device;
   determine the first audio device is a primary device based on the first link capacity value being greater than the second link capacity value;
   determine a number of hops for communication between the first audio device and the second audio device;
   determine a throughput value by calculating a harmonic mean of the first link capacity value and the second link capacity value divided by the number of hops;
   determine that the throughput value is greater than two times a first content rate, wherein the first content rate is indicative of an encoding bitrate associated with presentation of audio at a first level of quality;
   determine that a current content rate is less than or equal to one-half of the throughput value;
   determine a transfer limit rate that is twice the current content rate;
   send, to the second audio device using the first WLAN interface, audio data at the transfer limit rate; and
   send, to the first wireless speaker via the first Bluetooth interface, the audio data.

2. The first audio device of claim 1, wherein, to determine the first link capacity value, the first hardware processor executes the first computer-executable instructions to:
   determine a first physical receive rate of the first audio device;
   determine a first coexistence factor of the first audio device, wherein the first coexistence factor is indicative of an ability for a first network interface and the first Bluetooth interface to operate contemporaneously;
   determine an estimated efficiency of a protocol used to transfer the audio data;
   determine available airtime indicative of time the first WLAN interface is available for use; and
   determine the first link capacity value by multiplying the first physical receive rate, the first coexistence factor, the estimated efficiency, and the available airtime.

3. A computer-implemented method comprising:
   determining a first set of devices from a plurality of devices that are in communication with one another;
   determining, from the first set of devices, a first device configured to distribute first content to one or more other devices in the first set of devices;
   determining a link capacity value for the first device;
   determining, a plurality of link capacity values, wherein each link capacity value, of the plurality of link capacity values, is indicative of a link capacity for respective ones of the one or more other devices in the first set of devices at a particular time within a period of time;
   determining from among the plurality of link capacity values a lowest link capacity value;
   determining that a second device from the first set of devices has the lowest link capacity value;
   removing the second device from the first set of devices;
   determining that a third device from the first set of devices has a greatest link capacity value;
   determining a first transfer limit rate that specifies a maximum rate at which data is transferred between the third device and the one or more other devices in the first set of devices that are in communication with the third device; and
   based on the determination that the third device has the greatest link capacity value, sending the first content from the third device to the one or more other devices in the first set of devices at the first transfer limit rate.

4. The computer-implemented method of claim 3, wherein determining the link capacity value for the first device and the plurality of link capacity values further comprising:
   determining a first link capacity for the first device in the first set of devices;
   determining a second link capacity for the second device in the first set of devices;
   determining a third link capacity for the third device in the first set of devices; and
   determining that the third link capacity is greater than the second link capacity and the first link capacity, wherein the first link capacity, the second link capacity, and the third link capacity are indicative of how much data a particular device is able to transfer and are based at least in part on one or more of:
a physical receive rate of the particular device,
a coexistence factor that is indicative of an ability of the particular device to contemporaneously operate multiple wireless communication interfaces.
an estimated efficiency of a protocol used to transfer the first content, or
available airtime of the particular device.

5. The computer-implemented method of claim 3, further comprising:
determining throughput from the first device to the one or more other devices in the first set of devices based on the link capacity value;
determining the throughput is less than a threshold; and
removing from the first set of devices one of the one or more other devices that is associated with the throughput that is less than the threshold.

6. The computer-implemented method of claim 3, the determining the first transfer limit rate comprising:
determining a second link capacity value indicative of a link capacity between the third device and each of the one or more other devices in the first set of devices;
determining, based on the second link capacity value, throughput from the third device to each of the one or more other devices in the first set of devices;
determining the throughput is greater than a threshold;
determining a current content rate for the first content based on the throughput; and
setting the first transfer limit rate to twice the current content rate.

7. The computer-implemented method of claim 3, the determining the first transfer limit rate further comprising:
determining, at a plurality of times separated by at least a sleep interval, that each of the link capacity values is indicative of a link capacity for each of the one or more other devices in the first set of devices;
determining, based on the link capacity values, a set of throughput values, wherein each throughput value is indicative of throughput from the third device to a respective one of the one or more other devices in the first set of devices;
determining that the set of throughput values have been obtained for at least a specified period of time;
determining a lowest throughput value in the set of throughput values;
determining, based on the lowest throughput value, the first transfer limit rate;
removing, from the first set of devices, one or more devices having a link capacity below a threshold;
determining a variance of throughput values of throughput data for the at least the specified period of time is less than a variance threshold; and
increasing a duration of the sleep interval.

8. The computer-implemented method of claim 3, further comprising:
selecting a source content rate;
setting the first transfer limit rate to twice the source content rate;
determining a ping interval by calculating a reciprocal of a ping payload size divided by the first transfer limit rate;
sending, from the third device to a server and to the one or more other devices in the first set of devices, a plurality of pings at the ping interval;
determining ping statistics from the pings, wherein the ping statistics include a round trip time indicative of a round trip from the third device to each of the server and to the one or more other devices in the first set of devices;
determining a ping success value for the pings sent to each of the server and the one or more other devices in the first set of devices, wherein the ping success value is a number of ping replies received by the third device divided by a total number of pings sent by the third device;
determining a ping throughput rate for each of the server and the one or more other devices in the first set of devices based on the ping success values, wherein the ping throughput rate is a product of two times the ping payload size and the ping success value, divided by the round trip time;
determining a lowest ping throughput rate from among the ping throughput rates for each of the server and the one or more other devices in the first set of devices;
determining an adjusted transfer limit rate by multiplying the lowest ping throughput rate with a predetermined value; and
receiving the first content from the server at the first transfer limit rate.

9. The computer-implemented method of claim 3, further comprising:
determining a second transfer limit rate;
determining a server configured to provide content to the third device;
receiving, at the third device, second content from the server at less than or equal to the second transfer limit rate;
sending the second content from the third device to the one or more other devices in the first set of devices at less than or equal to the second transfer limit rate;
determining an actual transfer rate and number of hops to each of the server and the one or more other devices in the first set of devices;
determining an aggregate transfer rate comprising a sum of the actual transfer rates as multiplied by the number of hops;
retrieving the first transfer limit rate using the second transfer limit rate and the aggregate transfer rate; and
receiving the first content from the server at the first transfer limit rate.

10. The computer-implemented method of claim 3, further comprising:
determining a second transfer limit rate;
determining a server configured to provide content to the third device;
receiving, at the third device, second content from the server at a rate that is less than or equal to the second transfer limit rate;
sending the second content from the third device to the one or more other devices in the first set of devices at a rate that is less than or equal to the second transfer limit rate;
determining an actual transfer rate and number of hops to each of the server and the one or more other devices in the first set of devices, wherein the actual transfer rate is indicative of actual data transferred per unit of time;
determining a lowest actual transfer rate;
determining the lowest actual transfer rate is less than the second transfer limit rate;
determining an aggregate transfer rate comprising a sum of the actual transfer rates as multiplied by the number of hops;

determining the first transfer limit rate by multiplying the aggregate transfer rate by a predetermined value; and receiving the first content from the server at the first transfer limit rate.

11. The computer-implemented method of claim 10, further comprising:

determining a type of data transfer protocol used to transfer the first content;

determining a count of the plurality of devices; and retrieving, based on the type of data transfer protocol and the count, the predetermined value.

12. A computer-implemented method comprising:

determining a first set of devices that are in communication with one another using a first wireless protocol;

determining a link capacity for a first device of the first set of devices;

determining, a plurality of link capacity values, wherein each link capacity value, of the plurality of link capacity values, is indicative of a link capacity for respective ones of one or more other devices in the first set of devices at a particular time within a period of time;

determining from among the plurality of link capacity values a lowest link capacity value;

determining that a second device in the first set of devices has the lowest link capacity value;

removing the second device from the first set of devices;

determining that a third device in the first set of devices has a greatest link capacity value;

based on the determination that the third device has the greatest link capacity value, determining a first transfer limit rate; and based on the determination that the third device has the greatest link capacity value, sending first content from the third device to the one or more other devices in the first set of devices at a maximum of the first transfer limit rate.

13. The computer-implemented method of claim 12, further comprising:

receiving, at the third device, the first content from a server; and sending, from at least one device in the first set of devices, the first content to a presentation device using a second wireless protocol, wherein the first content comprises one or more of:

audio, video, an executable application, or text.

14. The computer-implemented method of claim 12, wherein the determining the link capacity further comprising:

determining a first link capacity for the first device;

determining a second link capacity for the second device;

determining a third link capacity for the third device; and determining that the third link capacity is greater than the first link capacity and the second link capacity, wherein the first link capacity, the second link capacity, and the third link capacity are indicative of how much data a particular device is able to transfer and is based at least in part on one or more of:

a physical receive rate of the particular device, a coexistence factor that is indicative of an ability of the particular device to contemporaneously operate multiple wireless communication interfaces, an estimated efficiency of a protocol used to transfer the first content, or available airtime of the particular device.

15. The computer-implemented method of claim 12, the determining the first set of devices comprising:

determining an individual link capacity value indicative of a link capacity between the first device and individual ones of the one or more other devices in the first set of devices using the first wireless protocol;

determining, based on the link capacity, throughput from the third device to the individual ones of the one or more other devices in the first set of devices;

determining the throughput is less than a first threshold; and wherein the first content is sent from the third device to the one or more other devices that have a link capacity value greater than a second threshold.

16. The computer-implemented method of claim 12, the determining the first transfer limit rate comprising:

determining link capacity values indicative of the link capacity between the third device and individual ones of the one or more other devices in the first set of devices using the first wireless protocol;

determining, based on the link capacity values, throughput from the third device to the individual ones of the one or more other devices in the first set of devices;

determining the throughput is greater than a first threshold;

determining a current content rate for the first content based on the throughput; and setting the first transfer limit rate to twice the current content rate.

17. The computer-implemented method of claim 12, further comprising:

selecting a source content rate;

setting a second transfer limit rate as twice the source content rate;

determining a ping interval by calculating a reciprocal of a ping payload size divided by the second transfer limit rate;

sending, from the third device to a server and to the one or more other devices in the first set of devices, a plurality of pings at the ping interval;

determining ping statistics from the plurality of pings, wherein the ping statistics include a round trip time indicative of a round trip from the third device to each of the server and to the one or more other devices in the first set of devices;

determining a ping success value for the plurality of pings sent to each of the server and the one or more other devices in the first set of devices, wherein the ping success value is a number of ping replies received by the third device divided by a total number of pings sent by the third device;

determining a ping throughput rate for each of the server and the one or more other devices in the first set of devices based on the ping success values, wherein the ping throughput rate is a product of two times the ping payload size and the ping success value, divided by the round trip time;

determining a lowest ping throughput rate from among the ping throughput rates for each of the server and the one or more other devices in the first set of devices;

determining an adjusted transfer rate limit by multiplying the lowest ping throughput rate with a predetermined value;

determining the lowest ping throughput rate is less than the adjusted transfer rate limit;

decreasing the source content rate; and determining the first transfer limit rate based on the decreased source content rate.

18. The computer-implemented method of claim 12, further comprising:
   determining a second transfer limit rate;
   determining a server configured to provide content to the third device;
   receiving, at the third device, second content from the server at the second transfer limit rate;
   sending the second content from the third device to the one or more other devices in the first set of devices at the second transfer limit rate;
   determining an actual transfer rate and number of hops to each of the server and the one or more other devices in the first set of devices;
   determining an aggregate transfer rate comprising a sum of the actual transfer rates as multiplied by the number of hops;
   retrieving the first transfer limit rate using the second transfer limit rate and the aggregate transfer rate; and
   receiving the first content from the server at the first transfer limit rate.

19. The computer-implemented method of claim 12, further comprising:
   determining a second transfer limit rate;
   determining a server configured to provide content to the third device;
   receiving, at the third device, second content from the server at less than or equal to the second transfer limit rate;
   sending the second content from the third device to the one or more other devices of the first set of devices at less than or equal to the second transfer limit rate;
   determining an actual transfer rate and number of hops to each of the server and the one or more other devices of the first set of devices, wherein the actual transfer rate is indicative of actual data transferred per unit of time;
   determining a lowest actual transfer rate;
   determining the lowest actual transfer rate is less than the second transfer limit rate;
   determining an aggregate transfer rate comprising a sum of the actual transfer rates as multiplied by the number of hops;
   determining the first transfer limit rate by multiplying the aggregate transfer rate by a predetermined value; and
   receiving the first content from the server at the first transfer limit rate.

20. The computer-implemented method of claim 19, further comprising:
   determining a type of data transfer protocol used by the first wireless protocol to transfer the first content;
   determining a count of the first set of devices; and
   retrieving, based on the type of data transfer protocol and the count, the predetermined value.

* * * * *